(12) United States Patent
Bastian, II

(10) Patent No.: US 7,262,685 B2
(45) Date of Patent: Aug. 28, 2007

(54) INVENTORY SYSTEM WITH BARCODE DISPLAY

(75) Inventor: William A. Bastian, II, Carmel, IN (US)

(73) Assignee: ASAP Automation, LLC, Indianapolis, IN (US)

(*) Notice: Subject to any disclaimer, the term of this patent is extended or adjusted under 35 U.S.C. 154(b) by 231 days.

(21) Appl. No.: 11/013,251

(22) Filed: Dec. 15, 2004

(65) Prior Publication Data

US 2005/0140498 A1 Jun. 30, 2005

Related U.S. Application Data

(63) Continuation-in-part of application No. 10/643,197, filed on Aug. 18, 2003, now Pat. No. 7,084,738, which is a continuation-in-part of application No. 09/734,360, filed on Dec. 11, 2000, now Pat. No. 6,650,225.

(51) Int. Cl.
*H04Q 9/00* (2006.01)
*G06F 7/00* (2006.01)
*G06Q 90/00* (2006.01)

(52) U.S. Cl. ............... 340/5.92; 340/5.91; 340/825.49; 340/5.9; 700/213; 235/385

(58) Field of Classification Search ............... 340/5.92, 340/5.91, 825.49, 5.9; 700/213; 235/385
See application file for complete search history.

(56) References Cited

U.S. PATENT DOCUMENTS 3,532,184 A 10/1970 Blake
3,716,697 A 2/1973 Weir (Continued)

FOREIGN PATENT DOCUMENTS

EP 0 971 303 A2 1/2000

(Continued)

OTHER PUBLICATIONS

Internet printout Jul. 13, 2000, "Carton Flow Pick-to-Light Systems: A Simulation Analysis For Batch vs. Single Order Pick Methodologies", 7 pages.

(Continued)

*Primary Examiner*—Jeffery Hofsass
*Assistant Examiner*—Scott Au
(74) *Attorney, Agent, or Firm*—Woodard, Emhardt, Moriarty, McNett & Henry LLP

(57) ABSTRACT

A pick/put to display (PTD) device includes an image display that allows the PTD device to display images related to a product, such as a picture of the product, a barcode or an instructional video. By having the capability to display images of the product, the PTD device is able to reduce the risk that the wrong product will be picked or placed in a storage location. Multiple barcodes can be scanned rapidly without the need to re-aim the scanner. The image display further allows the PTD device to display arrows that can point in a multitude of directions. With the capability of having arrows point in numerous directions, a single PTD device is able to service multiple storage locations, thereby reducing the number of PTD devices needed. The PTD device is further capable of downloading and playing sound files for a product so that audio instructions or alerts can be played.

16 Claims, 10 Drawing Sheets

U.S. PATENT DOCUMENTS

| | | | |
|---|---|---|---|
| 3,739,339 A | 6/1973 | Hillhouse et al. | |
| 3,770,941 A | 11/1973 | Gechele et al. | |
| 3,908,800 A | 9/1975 | Drapeau | |
| 4,044,227 A | 8/1977 | Holm et al. | |
| 4,237,598 A | 12/1980 | Williamson | |
| 4,332,012 A | 5/1982 | Sekine et al. | |
| 4,346,453 A | 8/1982 | Drapeau et al. | |
| 4,419,734 A | 12/1983 | Wolfson et al. | |
| 4,521,677 A | 6/1985 | Sarwin | |
| 4,598,459 A | 7/1986 | Klink et al. | |
| 4,625,396 A | 12/1986 | Ahmed et al. | |
| 4,646,245 A | 2/1987 | Prodel et al. | |
| 4,669,047 A | 5/1987 | Chucta | |
| 4,821,197 A | 4/1989 | Kenik et al. | |
| 4,827,395 A | 5/1989 | Anders et al. | |
| 4,942,534 A | 7/1990 | Yokoyama et al. | |
| 5,029,095 A | 7/1991 | Kenik et al. | |
| 5,097,421 A | 3/1992 | Maney et al. | |
| 5,151,684 A | 9/1992 | Johnsen | |
| 5,406,024 A | 4/1995 | Shioda | |
| 5,412,576 A | 5/1995 | Hansen | |
| 5,414,634 A | 5/1995 | Morgan et al. | |
| 5,489,773 A * | 2/1996 | Kumar | 235/380 |
| 5,505,473 A | 4/1996 | Radcliffe | |
| 5,537,126 A | 7/1996 | Kayser et al. | |
| 5,642,103 A | 6/1997 | Tokuda et al. | |
| 5,742,238 A | 4/1998 | Fox | |
| 5,781,443 A | 7/1998 | Street et al. | |
| 5,793,963 A | 8/1998 | Tapperson et al. | |
| 5,812,986 A | 9/1998 | Danelski | |
| 5,827,753 A | 10/1998 | Huang et al. | |
| 5,875,434 A | 2/1999 | Matsuoka et al. | |
| 5,910,653 A | 6/1999 | Campo | |
| 5,963,133 A | 10/1999 | Monjo | |
| 5,979,757 A | 11/1999 | Tracy et al. | |
| 6,109,568 A | 8/2000 | Gilbert et al. | |
| 6,172,657 B1 | 1/2001 | Kamakura et al. | |
| 6,249,263 B1 | 6/2001 | Kayser et al. | |
| 6,269,342 B1 | 7/2001 | Brick et al. | |
| 6,307,919 B1 | 10/2001 | Yoked | |
| 6,388,561 B1 | 5/2002 | Tuttle | |
| 6,445,370 B1 | 9/2002 | Goodwin, III | |
| 6,507,279 B2 | 1/2003 | Loof | |
| 6,513,016 B1 | 1/2003 | Freeny, Jr. | |
| 6,543,688 B1 | 4/2003 | Massaro | |
| 6,552,663 B2 | 4/2003 | Swartzel et al. | |
| 6,557,760 B2 | 5/2003 | Goodwin, III | |
| 6,592,033 B2 | 7/2003 | Jennings et al. | |
| 6,624,757 B1 | 9/2003 | Johnson | |
| 6,639,990 B1 | 10/2003 | Astrin et al. | |
| 2001/0054005 A1 | 12/2001 | Hook et al. | |
| 2002/0091569 A1 | 7/2002 | Kitaura et al. | |
| 2002/0191108 A1 | 12/2002 | Ko | |
| 2003/0040922 A1 | 2/2003 | Bodin | |
| 2003/0136832 A1 | 7/2003 | Massaro | |
| 2003/0220835 A1 | 11/2003 | Barnes, Jr. | |
| 2004/0043816 A1 | 3/2004 | Gilton | |

FOREIGN PATENT DOCUMENTS

| | | |
|---|---|---|
| EP | 1 168 885 A2 | 1/2002 |
| EP | 1 153 317 B1 | 3/2003 |
| JP | 404129902 A | 4/1992 |
| JP | 404173699 A | 6/1992 |
| JP | 2000118641 | 4/2000 |
| JP | 2001031218 A2 | 2/2001 |
| JP | 2001297568 A2 | 10/2001 |
| JP | 2002037417 A2 | 2/2002 |
| JP | 2002065418 A2 | 3/2002 |
| JP | 2002215012 A2 | 7/2002 |
| JP | 2002342727 A2 | 11/2002 |
| WO | WO 00/43944 | 7/2000 |
| WO | WO 01/33526 A1 | 5/2001 |
| WO | WO 03/043709 A1 | 5/2003 |

OTHER PUBLICATIONS

Internet printout Jul. 13, 2000, Data Control Systems, Inc. "CartRite® : Mobile RF-Cart/Batch Picking System", 3 pages.

Internet printout Jul. 10, 2000, Automation Associates, "AAI Warehouse Management System", 2 pages.

Internet printout Jul. 10, 2000, "IntelliTrack RF", 2 pages.

Internet printout Jul. 11, 2000, "RFID Solutions from Symbol Technologies", 4 pages.

Internet printout Jul. 10, 2000, e-Warehouse, "The RF/PC Module", 2 pages.

Internet printout Jul. 13, 2000, "Radio Frequency Data Communications (Overview)", 6 pages.

Internet printout Jul. 10, 2000, Majure Data OnLine, "RF Navigator", 2 pages.

Internet printout Jul. 10, 2000, Automation Associates, "Spectrum24 High-Performance Wireless LAN", 4 pages.

Ditlea, Steve, The Electronic Paper Chase, ScientificAmerican.com, Nov. 16, 2001.

Graham, Sarah, Scientists Fabricate Pliable Electronic Display, ScientificAmerican.com, May 8, 2003.

Eink.Com, Cross-Section of Electronic-Ink Microcapsules, E Ink Corporation, Nov. 3, 2003, © 2002 (http://www.eink.com/technology/index.html).

Product Literature, Gyricon LLC, SmartSign™ Part of the Gyricon family of networked signs, © 2003.

Exacta Extended Supply Chain Execution, Warehouse Management System (WMS) Software & Automatic Technologies, © 2004 ASAP Automation, LLC, 84 pages.

Exacta Light Directed Pick (LDP) User Guide for Gage Marketing For Exacta Release 2.X Configured for Pick and Pass, Effective Apr. 5, 2000, ASAP Automation, Inc. 35 pages.

ASAP Warehouse Management Software "Exacta" Automation for Supply Chain Logistics, 46 pages, Dec. 15, 2004.

7000 Series CAP-A1 System 7000 Series, "Ultimate Man-Machine Distribution System", 4 pages, Dec. 15, 2004.

"ROK 101 007 Bluetooth Module" by Ericsson, 21 pages , Dec. 15, 2004.

Bluetooth Radio Specification, Part A, Version 1.0B, 20 pages, Dec. 15, 2004.

"RFID Solutions from Symbol Technologies", Application Brief, Nov. 1999, 2 pages.

Kooser, Amanda C., "It's in the Air: Laptops and palmtops talking without wires? It's Bluetooth inside.", *Entrepreneur* Jul. 2000, 1 page.

Internet printout Jul. 13, 2000, IPCI Innovative Picking Technologies, Inc., "Snap-in" BUS, 2 pages.

Internet printout Jul. 13, 2000, IPCI Innovative Picking Technologies, Inc., "System Operation," 2 pages.

Internet printout Jul. 12, 2000, Order Picking systems "Pick-To-Trolley System® : Combination of RackRunner® With PTTS," 1 page.

Internet printout Jul. 12, 2000, Order Picking systems, "RackRunner Order Picking System: Introducing Industry to Order Fulfillment in the 21st Century," 2 pages.

Internet printout Jul. 6, 2000, Advanced Tracking System "IrdNet™", 2 pages.

Internet printout Jul. 13, 2000, "Accupic Pick-to-light", 2 pages.

Internet printout Jul. 11, 2000, Sourcewire.com, "Symbol Wireless Technology Selected for J.C. Penney State-of-the-Art Distribution Center", 2 pages.

Internet printout Jul. 10, 2000, Catalyst Warehouse Management Systems, 4 pages.

Internet printout Jul. 13, 2000, Eli Lilly & Company "Key System Technologies", 2 pages.

Internet printout Jul. 13, 2000, "Accupic Mobile Batch Pick Carts", 2 pages.

* cited by examiner

INVENTORY SYSTEM WITH BARCODE DISPLAY

CROSS-REFERENCE TO RELATED APPLICATIONS

The present application is a continuation-in-part of U.S. patent application Ser. No. 10/643,197, filed Aug. 18, 2003 now U.S. Pat. No. 7,084,738, which is a continuation-in-part of U.S. patent application Ser. No. 09/734,360, filed Dec. 11, 2000, now U.S. Pat. No. 6,650,225, which are hereby incorporated by reference in their entirety.

BACKGROUND

The present invention generally concerns material handling systems, and more specifically, but not exclusively concerns an integrated material handling systems with image display capabilities.

To manage and control inventories, companies have been adopting automated light directed inventory systems so as to reduce paperwork and increase efficiency. In a usual light directed inventory system, pick/put to light (PTL) devices are used to direct an operator's attention to a particular bin, shelf location, or carousel in a warehouse. For instance, a light on the PTL device may illuminate so that the operator knows which storage location needs to be serviced. Once at the desired storage location, the operator can add (put), remove (pick) or count the required items at the storage location.

Although PTL devices have increased supply chain efficiency, there is always the risk that items may be moved or bins can be rearranged so that the operator removes or adds the wrong item. Since typical PTL devices at the most only display the desired quantities of items, the operator can never be sure that the right item handled. These and other types of handling errors can sometimes create dire circumstance, especially in the medical industry. For example, if an employee of a pharmaceutical company or hospital retrieves the wrong medication, a patient's health may be placed in jeopardy.

Cost is always a concern for any type of inventory system. Even though the PTL device systems improve efficiency, the initial purchase price and maintenance costs associated the PTL devices may offset any economic advantage gained by their installation. Typical light directed inventory systems require a PTL device to be positioned at every storage location so that an operator is able to identify the storage location. Even in a modestly sized warehouse, the number of PTL devices needed to service each location can become quite large. In addition, some storage locations are not suitable to have PTL devices mounted close by.

To save cost, some customers implement PTL systems in a piecemeal fashion such that some older automated systems remain in use that need still need to interface with the new PTL system. For example, a company may still continue to use a proprietary inventory tracking system that is specifically tailored to their particular needs, but the system needs to obtain servicing information about individual servicing locations and/or items. Retrofitting the older system to the newer PTL system through software changes can be difficult, if not nearly impossible, both technically and economically speaking. For instance, the original programmers for the system may no longer be available to implement the required changes.

Retrofitting PTL devices to current paper based or some automatic systems can be problematic. For instance, the Food and Drug Administration (FDA) requires that the barcode on packaging of products as well as the bin location barcodes be scanned each time a drug or other medical product is handled so as to reduce the chance of the wrong product being selected. Also, for safety, it is sometimes required that the personnel scan a barcode on the packaging as well as a second product identification barcode, located near the bin or on a checklist, to confirm that the correct product was being handled. Typically, a paper barcode that identifies the location is affixed to each storage bin or storage location. These barcode labels can be damaged through everyday handling, and as a result, need to be replaced. Location identification barcode labels by their very nature need to be placed at or near the location that they identify. Occasionally, barcode labels are placed at locations that make the labels difficult to read, such as when labels are wrapped around irregularly shaped poles. The nature of the location can make identification of the location through a barcode a very daunting task. For example, the sites in which barcode labels can be affixed are limited, which can lead to barcode labels being located at locations that are less ideal for scanning, such as areas where the barcode can become easily covered with dirt. These undesirable conditions can lead to missed readings, which in turn hurts overall operational efficiency. As should be realized, storage locations can be fixed or dynamic. Sometimes storage bins are moved along an assembly line or carousel, or are normally fixed in position, but moved periodically. If the bin is moved, or the warehouse is rearranged, the paper barcode that identifies the location becomes obsolete and has to be replaced with a new one. As a result, this can create many logistical problems and creates room for error.

Besides tracking location, other difficulties occur with barcode systems. Warehouse personnel experience many difficulties when gathering and updating warehouse information. Instructions on where and when to scan barcodes is limited so that mistakes are often made. Aiming of the barcode scanner can present some difficulty, and this miss aiming of the barcode scanner occasionally results in the scanning of the wrong barcode. Personnel can also scan barcodes out of sequence, which can lead to errors as well as reduce overall efficiency. As an example, a worker might repeatedly scan the location barcode with the wrong belief that they are scanning a product or some other type of barcode, which is actually located elsewhere.

Systems have been proposed in which product identification barcodes are displayed on televisions for identifying televisions model or serial number for after market servicing purposes. While other systems have been proposed that display product identification barcodes for bulk items at point of service (POS) checkout terminals. However, none of these systems address the unique problems associated inventory tracking for warehousing or manufacturing environments. For example, none of these systems recognize the problems associated with location related barcodes or the logistics involved in tracking and updating barcodes for multiple locations. Moreover, none of these systems consider the practical difficulties involved in scanning multiple barcodes or environmental conditions that can affect scanning and lead to errors.

Thus, there remains a need for improvement in this field.

SUMMARY

One form of the present invention concerns a technique in which a pick/put to display device is provided with an image display and an indicator light. The indicator light is illuminated to alert an operator of a service to be performed on an item at a storage location. A service instruction for the item is displayed on the image display, and an image of the item is displayed on the image display.

Another form concerns a technique for reducing the number of pick/put to display devices needed for a storage area. A pick/put to display device with an image display is positioned between a first storage location and a second storage location. A first arrow pointing toward the first storage location and a first instruction for servicing the first storage location are displayed on the image display. A second arrow pointing toward the second storage location and a second instruction for servicing the second storage location are displayed on the image display.

A further form concerns a technique in which an operator is alerted of a service to be performed on an item at a storage location with a pick/put to device that has an image display. Instructions concerning the item at the storage location are displayed on the image display. An image concerning the item at the storage location is displayed on the image display.

A further form concerns a system that includes a pick/put to display device that is positioned proximal a storage location. The pick/put to display device includes a processor that is operable to download an instruction and an image that concern an item associated with the storage location. Memory is operatively coupled to the processor, and an indicator light is operatively coupled to the processor to alert an operator of a servicing task for the item at the storage location. An image display is operatively coupled to the processor to display the instruction and the image concerning the item at the storage location.

In another form, a system includes a first storage location configured to store a first item and a second storage location configured to store a second item. A pick/put to display device is positioned between the first storage location and the second storage location to handle service instructions for both the first storage location and the second storage location. The pick/put to display device has an image display configured to display a first arrow that points toward the first storage location and a second arrow that points to the second storage location.

A further form concerns a technique in which a pick/put to display device is provided that includes an alert device and a display. The pick/put to display device is located proximal to at least a first inventory location and a second inventory location. Attention is drawn to the pick/put to display device by activating the alert device. A first location barcode is displayed on the display that identifies the first inventory location, and a second location barcode is displayed on the display that identifies the second inventory location.

Another form relates to a technique in which a pick/put to display device is provided that includes an alert device and a display. Attention is drawn to the pick/put to display device by activating the alert device. A first barcode is displayed on the display of the pick/put to display device, and input is received with the pick/put to display device. A second barcode is displayed on the display of the pick/put to display device after receiving the input.

Still yet a further form concerns an apparatus that includes a pick/put to display device located proximal to at least one storage location. The pick/put to display device includes a processor and an alert device operatively coupled to the processor. The alert device is configured to draw attention to the pick/put to display device. An image display is operatively coupled to the processor, and the image display is operable to display at least one barcode related to the storage location. A server is operatively coupled to the pick/put to display device, and the server is operable to update the barcode by transmitting the update to the pick/put to display device.

A further form relates to a system that includes a storage system. The storage system includes at least a first storage location and a second storage location. A pick/put to display device is positioned proximal the first storage location and the second storage location. The pick/put to display device includes means for drawing attention to the pick/put to display device and means for displaying a first barcode related to the first storage location and a second barcode related to the second storage location.

Other forms, embodiments, objects, features, advantages, and aspects of the present invention shall become apparent from the detailed drawings and description contained herein.

DESCRIPTION OF SELECTED EMBODIMENTS

Figure 1:
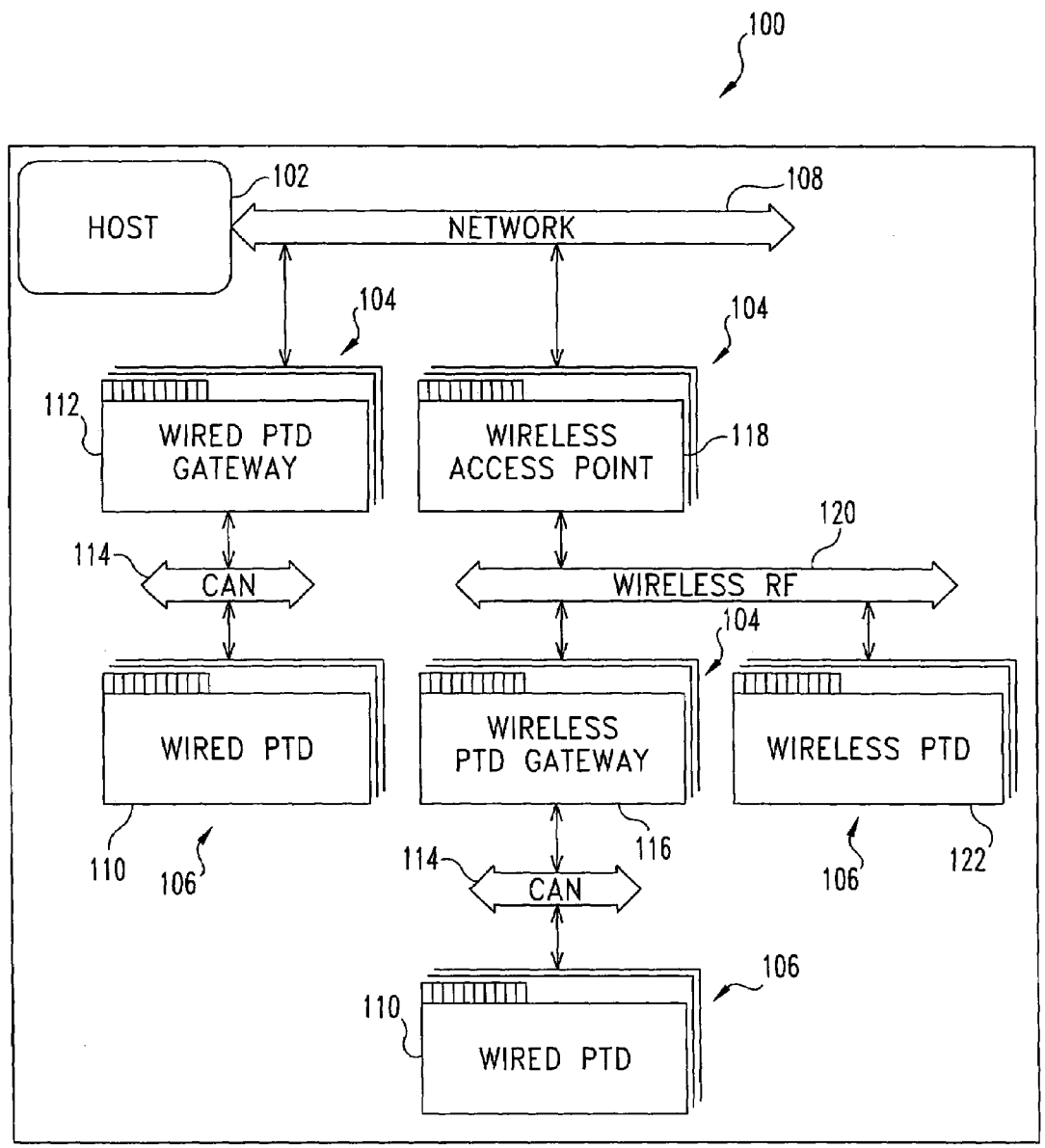
FIG. 1 is a diagrammatic view of an inventory system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the art that some of the features which are not relevant to the invention may not be shown for the sake of clarity.

FIG. 1 depicts, with a diagram, an inventory management system 100 according to one embodiment of the present invention. The system 100 includes at least one host 102, one or more pick/put to display (PTD) gateways (or routers) 104, and one or more pick/put to display (PTD) devices 106. The host 102 stores information about inventoried items and manages orders for the items. In one embodiment, the host 102 includes a file server that stores inventory information, and in one particular form, the host 102 includes a personal computer. As should be appreciated, in other embodiments, multiple computers can be operatively coupled together to form the host 102. It nevertheless contemplated that the host 102 can include other types of computing devices as would occur to those skilled in the art. The host 102 and the PTD devices 106 communicate with one another by sending messages over a network 108. For example, the host 102 can send a message to one of the PTD devices 106 so that the PTD device 106 alerts an operator of a servicing task for a specific item, such as picking a predefined number of items from a bin.

The PTD devices 106 are normally located near one or more inventory storage locations, and the PTD devices 106 are used to alert operators of tasks and provide instructions concerning the tasks. As will be discussed in greater detail below, the PTD devices 106 according to the present invention are able to provide task or service instructions for multiple inventory locations and/or items, thereby reducing the number of PTD devices 106 needed in the system 100. As illustrated in FIG. 1, the host 102 and the PTD devices 106 communicate with one another via the PTD gateways 104. In one embodiment, the gateway includes a computer. However, as should be appreciated, the PTD gateways 104 include any type of computer gateway as would occur to those skilled in the art. The PTD gateways 104 communicate with the server 102 through the network 108. The network 108 includes any type of communication network as would occur to those skilled in the art. By way of non-limiting examples, the network 108 can include the Internet and/or one or more other Wide Area Networks (WAN), a Local Area Network (LAN), a proprietary network such as provided by America On Line, Inc., or a combination of these, to name a few.

In the illustrated embodiment, the PTD devices 106 communicate to the server 102 through a wired and/or wireless connection. Referring to FIG. 1, the PTD devices 106 include a wired PTD device 110 that is operatively coupled to a wired PTD gateway 112 through a controller area network (CAN) 114. In another illustrated form, the wired PTD device 110 is operatively coupled through CAN 114 to a wireless PTD gateway 116. The wireless PTD gateway 116 communicates with a second wireless PTD gateway 116, wireless access point 118, through a wireless network 120. The PTD devices 106 further include a wireless PTD device 122 that communicates with the wireless access point 118 through the wireless network 120. As should be appreciated, the inventory system 100 in other embodiments can include additional components, exclude selected components and/or can be configured in a different manner. For example, the system 100 in other embodiments can exclusively include wired PTD devices 110 or wireless PTD devices 122.

Figure 2:
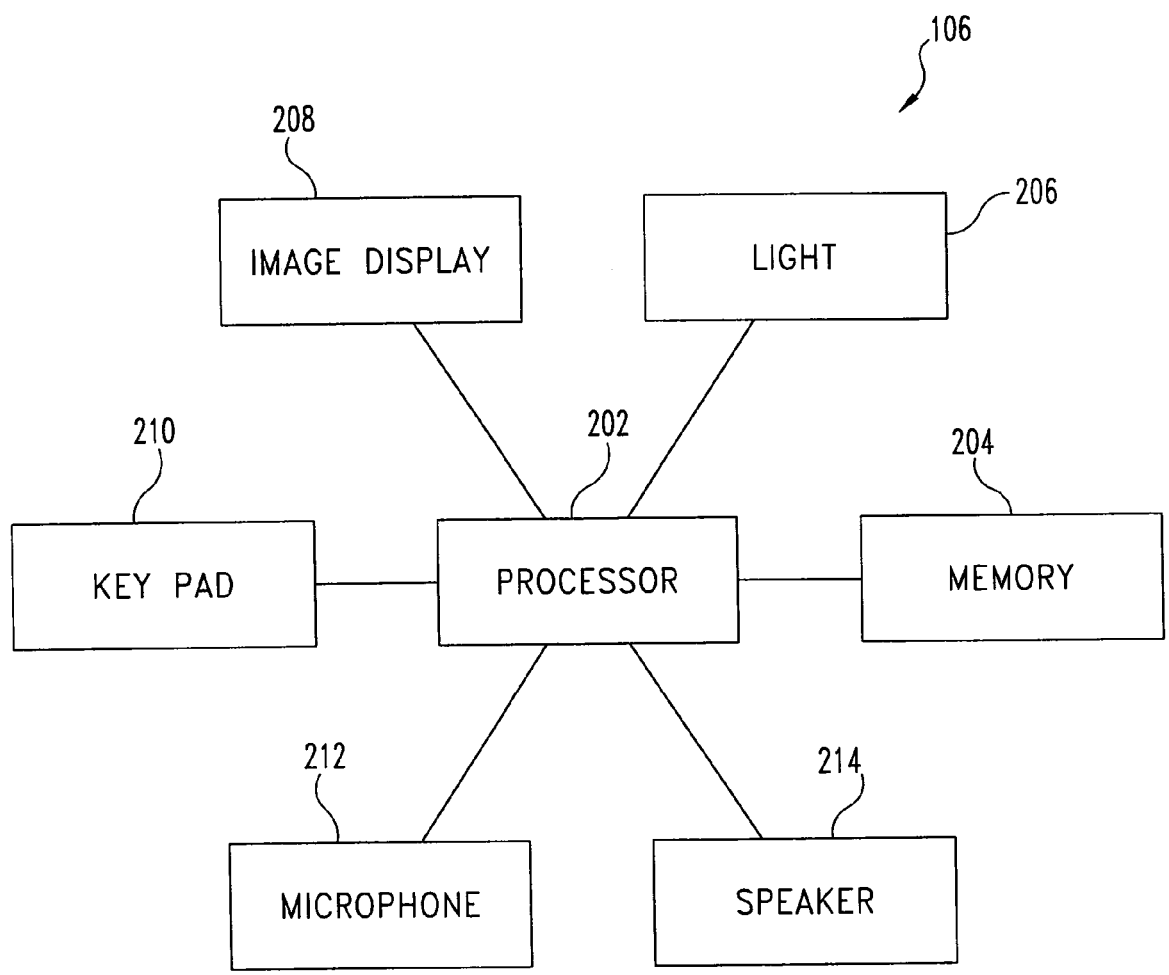
FIG. 2 is a diagrammatic view of a pick/put to display (PTD) device used in the FIG. 1 system.

A diagrammatic view of one of the PTD devices 106 is illustrated in FIG. 2. As depicted, the PTD device 106 includes a processor 202 for controlling the operation of the PTD device 106 and processing communications with the host 102. The processor 202 may be comprised of one or more components. For a multi-component form of the processor 202, one or more components can be located remotely relative to the others, or configured as a single unit. Furthermore, processor 202 can be embodied in a form having more than one processing unit, such as a multiprocessor configuration, and should be understood to collectively refer to such configurations as well as a single-processor-based arrangement. One or more components of processor 202 may be of the electronic variety defining digital circuitry, analog circuitry or both. Processor 202 can be of a programmable variety responsive to software instructions, a hardwired state machine, or a combination of these.

As depicted in FIG. 2, the processor 202 communicates with and/or controls a number of components in the PTD device 106. These components in the illustrated embodiment include at least each one of the following: memory 204; an indicator light 206; an image display 208; a manual input device or key pad 210; a microphone 212; and a speaker 214 that are each operatively coupled to the processor 202. It is contemplated that in other embodiments at least some of these components can be directly operatively coupled to one another and/or selected components can be added or removed. Among its many functions, memory 204 stores information that is related to inventory storage locations and items, such as images, videos (movies), sound (voice) recordings, file addresses, text instructions, product descriptions and product quantities, to name a few. Memory 204 can include one or more types of solid state electronic memory, magnetic memory, or optical memory, just to name a few. By way of nonlimiting examples, the memory can include solid state electronic random access memory (RAM), sequential access memory (SAM), such as first-in, first-out (FIFO) variety or last-in, first-out (LIFO) variety, programmable read only memory (PROM), electronically programmable read only memory (EPROM), or electronically erasable programmable read only memory (EEPROM); an optical disc memory (such as a DVD or CDROM); a magnetically encoded hard disc, floppy disc, tape, or cartridge media; or a combination of these memory types. In addition, the memory 204 may be volatile, non-volatile, or a hybrid combination of volatile, non-volatile varieties.

The processor 202 illuminates the indicator light 206 to direct the attention of the operator to a selected PTD device 106. The indicator light 206 includes any type of illumination device as would occur to those skilled in the art. By way of nonlimiting examples, the indicator light 206 can include an incandescent light bulb, a fluorescent light bulb, a light emitting diode (LED) or a combination of these. The processor 202 on the image display 208 displays images of items, direction arrows, instructions, quantities and other information. The images displayed on the image display 208 can be animated (such as a video), static, two-dimensional and/or three-dimensional. The image display 208 includes any type of image displaying device as would occur to those skilled in the art. By way of non-limiting examples, the image display 208 can include a liquid crystal type display (LCD), an LED type display, a cathode ray tube (CRT), an organic light emitting diode (OLED) type display, and/or a plasma display, to name just a few. In one embodiment, the image display 208 includes an OLED type display in order to conserve energy in the PTD device 106 and to improve the viewable angle of the image display 208. OLED type displays have a wide viewable angle of approximately one hundred and seventy degrees (170°), which in turn improves the overall visibility of the image display 208 to the operator in a warehouse type environment. With the display capabilities of the image display 208, the PTD device 106 is able to provide instructions for multiple inventory locations, and provide greater flexibility in the format and type of instructions. In the PTD device 106, the image display capabilities of display 208 can reinforce the textual instructions by providing an image of the item to be picked from, put into or counted at an individual storage location. Moreover, animations or videos can be shown on the image display 208 to illustrate techniques for handling and packaging items as well as other information.

The operator interfaces with the PTD device 106 through the keypad 210. It should be understood that the keypad 210 can encompass other types manual input devices, such as a mouse or a digitized pen, for example. The keypad 210 includes one or more buttons that are used by the operator to manually enter information. For example, the operator can change the quantities picked or select menu options with the keypad 210. The operator can also interface with the PTD device 106 vocally via the microphone 212 and receive voice instructions or other audio signals through the speaker 214. For instance, in addition to or as a substitute for the indicator light 206 being illuminated, the speaker 214 can emit a sound, such as a voice command, to direct the attention of the operator to a particular PTD device 106. The vocal/audio interface provided by the microphone 212 and the speaker 214 allows for hands-free operation of the PTD device 106. For instance, in response to a voice instruction from the speaker 214 of the PTD device 106, the operator can audibly instruct the PTD device 106 through the microphone 212 that a task has been completed.

Figure 3:
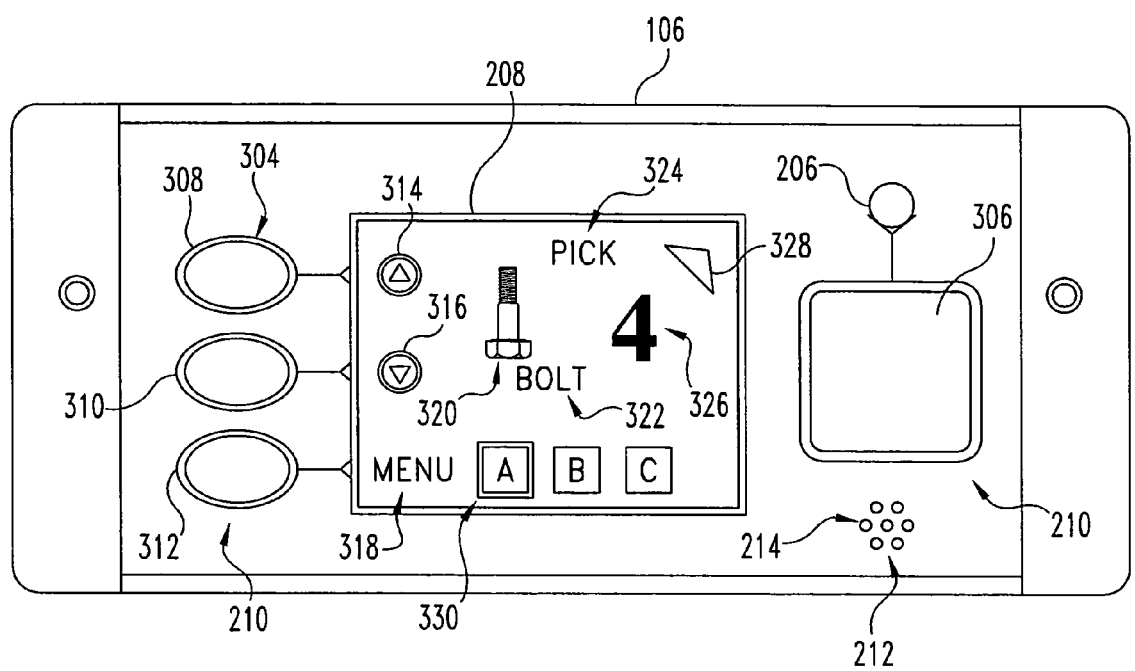
FIG. 3 is a front view of the FIG. 2 PTD device displaying a pick item screen.

A PTD device 106 according to one embodiment of the present invention is illustrated in FIG. 3. As shown, the indicator light 206, image display 208, keypad 210, microphone 212 and speaker 214 are mounted to a housing 302. While not shown, the processor 202 and memory 204 in the embodiment depicted in FIG. 3 are mounted inside the housing 302. In the illustrated embodiment, the keypad 210 includes menu buttons 304 and a task complete button 306. To prevent the wrong buttons from being accidentally pushed, the menu 304 and task complete 306 buttons are positioned on opposite sides of the image display 208. As illustrated, the menu buttons 304 are positioned near the image display 108 so that the menu buttons 304 can be used to navigate a menu system that is displayed on the image display 208. The menu buttons 304 are also used to adjust the actual quantity handled in an order, and the menu buttons 304 can further be used to rotate three dimensional images on the image display 208 or control playback of sounds (voice recordings) and videos (i.e., fast forward and rewind).

In the illustrated embodiment, the menu buttons 304 include first 308, second 310 and third 312 menu buttons. However, it is contemplated that in other embodiments the menu buttons 304 can include more or less buttons than depicted. Referring to FIG. 3, the image display 208 is operable to display increase quantity 314 and decrease quantity 316 indicators, which are positioned near the first 308 and second 310 menu buttons, respectively. By pressing the first menu button 308, the operator is able to increase the quantity, and the operator is able to decrease the quantity by pressing the second menu button 308. In one form, when the first 308 and second 310 buttons are pressed at the same time, the actual quantity is set to zero. In the screen displayed on the image display of FIG. 3, a menu indicator 318 is displayed on the image display 208 proximal the third menu button 312, such that the operator gains access to the menu system of the PTD device 106 by pressing the third menu button 312. Once the particular service task is complete, the operator in one embodiment presses the task complete button 306 in order to notify the PTD device 106 that the task is completed. It is contemplated that in other embodiments the operator can verbally communicate to the PTD device 106 that the task is complete through the microphone 212.

As noted above, the image display 208 gives the PTD device 106 the ability to handle multiple storage locations, and further, gives the PTD device 106 the ability to display images of items or images associated with items so as to reduce handling errors. Ensuring that the correct item is added or removed from a storage location (or counted) can be especially critical in industries that have similar looking items, such as the pharmaceutical industry where pills can look very similar. Furthermore, certain items, such as hazardous or fragile items, may require special handling procedures that are not easily conveyed through text alone, but are easily understood visually. The image display 208 of the present invention has the ability to visually convey such information, thereby reducing many types of inventory/handling problems. By being positioned near the storage location being serviced, the PTD device 106 can be a readily available source of information for the operator. In contrast, typical paper-based, manuals are usually rather large and are centrally located at one location, which in turn discourages their use.

In FIG. 3, the image display 208 shows an image 320 of an item to be picked, which in the illustrated example is a bolt. It should be understood that other types of images 320 can be shown on the image display 208 in conjunction with other types of instructions. For example, the image 320 can be of the package in which the item is packed, additional views of the item, icons, warning signs and instructional pictures or videos for the item. The image display 208 is further configured to display textual information, such as a name or description of an item 322, an instruction 324 (i.e., pick, put, or count) and quantity 326.

In addition, the image display 208 is operable to display a location arrow 328 that indicates the location of where the task is to be performed. As will be appreciated from the discussion below, displaying the location arrow 328 on the image display 208 gives the PTD device 106 the flexibility to provide instructions for multiple storage locations regardless of the position of the storage location relative to the PTD device 106. The image display 208 is further capable of displaying location arrows 328 of different sizes, shapes, colors and/or styles as well allows the locations arrows 328 to be animated. This capability of modifying the location arrows 328 displayed on the image display 208 allows the PTD device 108 to be easily configured for different environmental conditions. For example, if the PTD device 106 is located on an upper shelf of a storage bay, the properties of the location arrow 328 can be adjusted so that the location arrow 328 is easily visible. In another example, to provide directions to a designated PTD device 106 that requires a service to be performed, the location arrows 328 on nearby PTD devices 106 can be animated so as to point and move towards the designated PTD device 106.

The image display 208 is further capable of displaying additional information in order to locate an item. As should be appreciated, individual storage locations can be further subdivided or partitioned to form separate compartments or cells in which different items are stored. As depicted in FIG. 3, the image display 208 is further capable of displaying cell location icons or indicators 330 that indicate the particular cell to service. In the image display 208, the cell icons 330 can be arranged to correspond to the relative locations of cells. For example, the image display 208 in FIG. 3 shows cell icons 330 for cell locations "A", "B" and "C" in a row. The cell icon 330 for cell "A" is highlighted to indicate that, for the storage location where the location arrow 328 points, the operator should pick four (4) bolts from cell "A".

Figure 4:
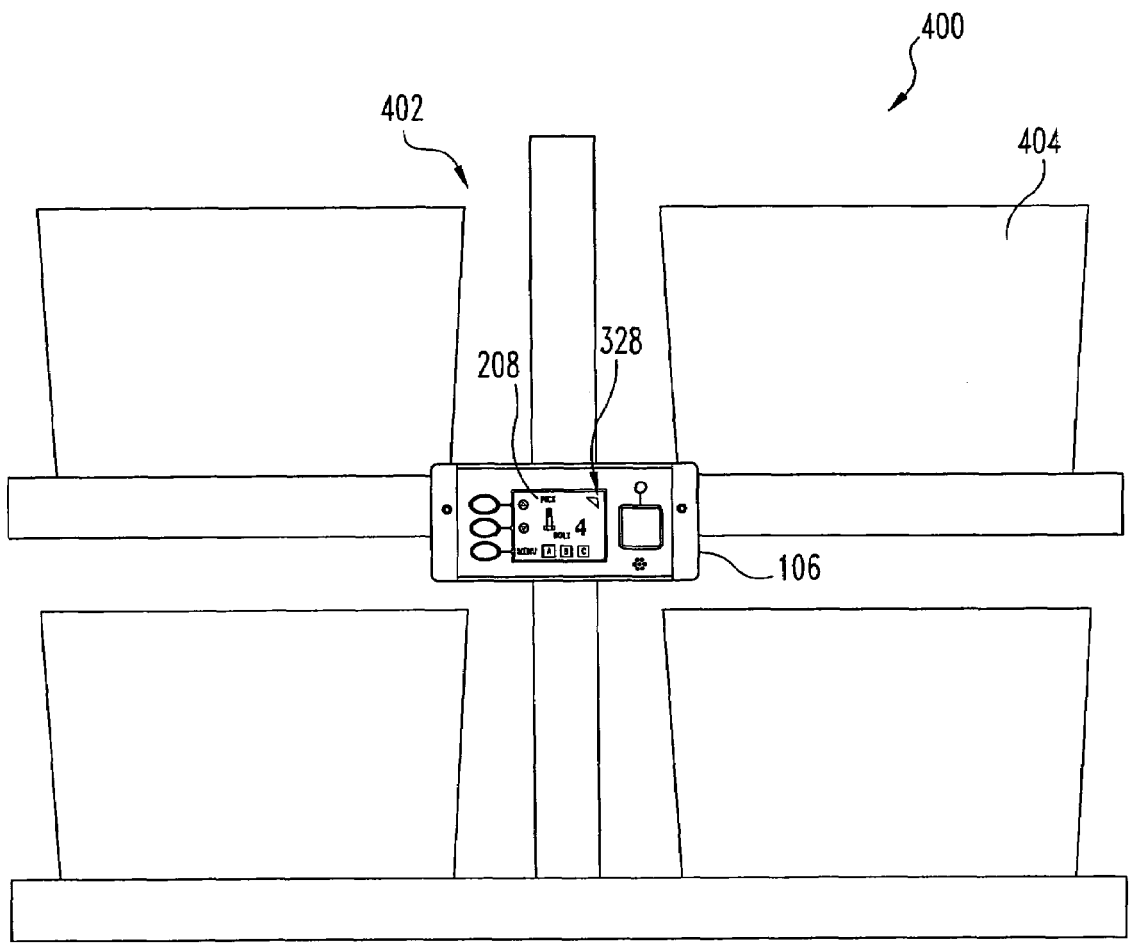
FIG. 4 is a front view of the FIG. 3 PTD device positioned to handle multiple storage locations.

Referring to FIG. 4, an example of an inventory storage system 400 is illustrated in which the PTD device 106 is mounted to service multiple storage or service locations 402 at the same time. Although the embodiment will be described with reference to a shelving unit with bins, it should be appreciated that the PTD device 106 can be used in other types of situations. In the illustrated embodiment, the PTD device 106 is mounted between four (4) storage locations 402, which each contain a bin 404 in which items are stored. To indicate the bin 404 to be serviced, the PTD device 106 displays on the image display 208 the location arrow 328 that points to the desired storage location 402. In the example illustrated in FIGS. 3 and 4, the location arrow 328 points towards the storage bin 404 that is located at the upper, right side of system 400, and the PTD device 106 further indicates that four (4) bolts should be picked from the designated bin 404. It should be understood that, with the added flexibility provided by the image display 208, the PTD device 106 can be easily reconfigured to handle more or less storage locations 402 than is shown. For example, if the layout of a warehouse is changed, the PTD device 106 can be easily re-installed at a different location.

Figure 5:
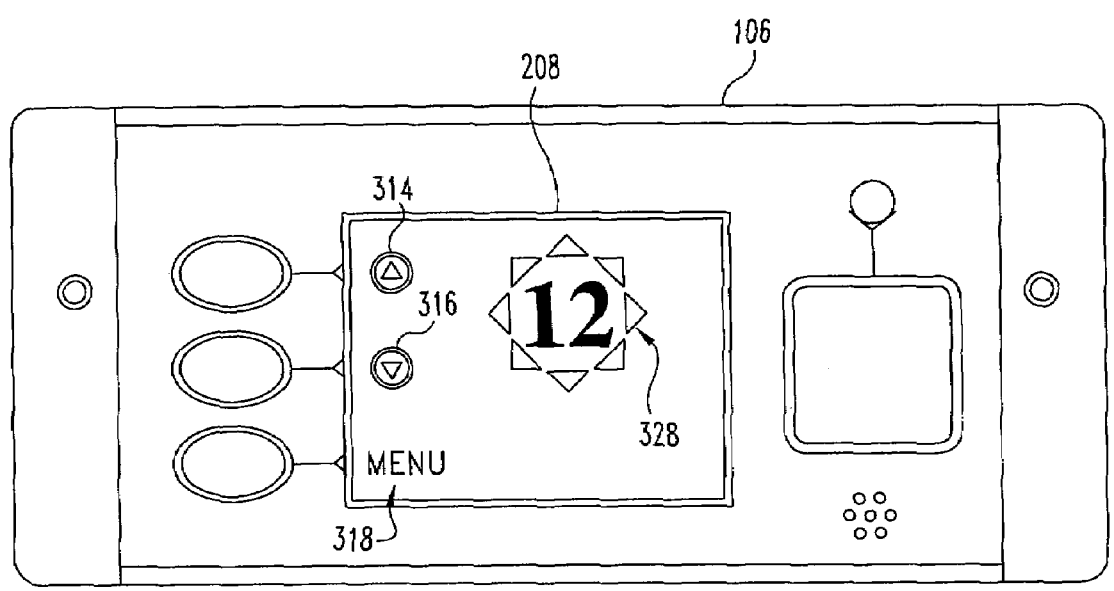
FIG. 5 is a front view of the FIG. 3 PTD device displaying a multiple location arrows screen.

As shown in FIG. 5, the image display 208 is capable of displaying location arrows 328 that accurately point in a multitude of directions. In one embodiment, the image display 328 is capable of displaying location arrows 328 that are able to point throughout a full three hundred and sixty-degree (360°) range. Having the ability to accurately point to storage locations 402 with the location arrows 328 on the image display 208, helps to reduce the chance the operator will mistakenly service the wrong storage location 402. Location arrows 328 are also able to point in non-orthogonal directions so that, if the PTD device 106 were installed closer to one storage location 402 and farther away from others, the location arrow 328 can be adjusted to accurately point toward the actual locations of the storage locations 402.

As previously mentioned, the image display 208 and speaker 214 give the PTD device 106 the ability to display and/or play media content, such as images of items or voice-base instructions, thereby enriching the instructional information available to the operator. A technique for displaying and/or playing media content on the PTD device 106 will now be described with reference to a flow chart 600 in FIG. 6. To aid in understanding the technique, a communication protocol for the inventory management system 100 will be described below. It, however, should be understood that the present invention is not intended to be limited to just the communication protocol described below, and it is contemplated that other types communication protocols are can be used in communications between the host 102 and the PTD device 106.

According to one embodiment of the present invention, extensible markup language (XML) is used in communications between the PTD devices 106 and the host 102. Using XML allows for greater flexibility in system design and improves interoperability. Table 1 below lists a detailed description of the XML tags that are sent by the host 102 to the PTD device. It is contemplated other types of tag names can be used.

TABLE 1

Host to PTD Device

| Tag | Tag Description | Data | Attribute |
|---|---|---|---|
| | | REQUIRED TAGS | |
| SID | Source ID | TCP/IP address for source of message. Required tag. | N/A |
| DID | Device ID | TCP/IP address for destination device. Required tag. | N/A |
| OP | Operation | Operation values:<br>1 = Pick. Pick operations.<br>2 = Put. Put operations.<br>3 = Illuminate. Light device.<br>4 = Count. Count operations.<br>7 = Ping. Receive status of PTD's.<br>8 = Reset. Resets devices.<br>9 = Set Location. Sets menu data.<br>10 = Self test. Runs PTD test.<br>11 = Sleep. Sets to sleep mode.<br>12 = Set ID. Set ID for PTD.<br>13 = Generic FTP<br>Required tag. | B (Beep) X/Y/Z where<br>0 = No beep (default)<br>X = Beep frequency in seconds<br>Y = Timer where beep frequency changes<br>Z = New beep frequency after timer expires.<br>Example: Beep 7/120/2 causes the device to beep every 7 seconds until the device has been illuminated for 2 minutes with no task complete. After the 2 minutes is up, beeps every 2 seconds. |
| | | OPTIONAL TAGS | |
| AFTP | Audio FTP File | FTP file name of the audio file associated with the device and location specified in the message. PTD client will use FTP to connect to the server and download the sound (i.e., .WAV) file. Location is identified by the arrow direction. | A (IP Address) (default = Host IP address)<br>P (Path) (default = login directory) |
| ARW | Arrow | Product association index. An associated Screen Layout file contains screen position (relative to quantity) where arrow displays:<br>1 = TOP(default)<br>2 = BOTTOM<br>3 = LEFT<br>4 = RIGHT<br>5 = NE (points northeast)<br>6 = NW (points northwest)<br>7 = SE (points southeast)<br>8 = SW (points southwest)<br>Note: Also provided on location set up to indicate which location info relates to (top, bottom, left, right) for the device. | I (Intensity)<br>0 = No display (default)<br>1 = Low intensity on display<br>2 = Med. Intensity on display<br>3 = High intensity on display<br>S (Size)<br>0 = Small<br>1 = Medium<br>2 = Large<br>3 = Extra Large<br>F (Flash) |

TABLE 1-continued

Host to PTD Device

| Tag | Tag Description | Data | Attribute |
|---|---|---|---|
| | | | 0 = no flash<br>1 = slow<br>2 = fast<br>C (Color) 1–4 |
| DSC | Product Description | Product description for the product ID associated with the device and location specified in the message. Location is identified by the arrow direction. | Display attributes for the product:<br>F (Flash)<br>0 = no flash<br>1 = slow<br>2 = fast<br>If not provided, assume solid display.<br>C (Color) 1–4<br>L (Label) screen display label for this info (Part Desc., Product Desc, etc.). |
| IFTP | Image FTP File | FTP file name of the image associated with the device and location specified in the message. PTD client will use FTP to connect to the server and download the image file. Location is identified by the arrow direction. | A (IP Address) (default = Host IP address)<br>P (Path) (default = login directory) |
| IND | Indicator light illumination | Values are:<br>0 = No illumination<br>1 = Solid - default<br>2 = Flash<br>3 = Rapid flash<br>If tag is not provided, indicator light is illuminated. | N/A |
| ITS | Presence of instruction text lines.<br>Header level tag | When ITS is supplied, one or more IT tags are supplied as well. This is a node, not an element. Holds a collection of IT tags. | N/A |
| IT | Instruction text details | Instruction text may contain any textual information.<br>If tag is not provided or empty, nothing displays, no illumination. | F (Flash)<br>0 = no flash<br>1 = slow<br>2 = fast<br>If not provided, assume solid display.<br>C (Color) 1–4<br>L (Line) line number of display |
| LOT | Lot Number | Alphanumeric Lot number stored at the location. Location is identified by the arrow direction. | Display attributes for the product:<br>F (Flash)<br>0 = no flash<br>1 = slow<br>2 = fast<br>If not provided, assume solid display.<br>C (Color) 1–4<br>L (Label) screen display label for this info (lot number, batch number, etc.). |
| NDI | New Device ID | New PTD device IP address for the 'Set ID' command. | P (Port) (default = 1357) |
| PID | Product ID | Alphanumeric product ID associated with the device and location specified in the message. Location is identified by the arrow direction. | Display attributes for the product:<br>F (Flash)<br>0 = no flash<br>1 = slow<br>2 = fast<br>If not provided, assume solid display.<br>C (Color) 1–4<br>L (Label) screen display label for this info (Part #, Product ID, SKU, etc.). |
| PLY | Play Audio/Video | This tag specifies if the product audio/video should be played.<br>Values:<br>0 = Do not play (default)<br>1 = Play audio at task complete time<br>2 = Play audio to alert attention<br>3 = Play video at task complete time<br>4 = Play video to alert attention<br>If tag is not provided, no audio/video plays automatically. May still be initiated through menu option. | N/A |

TABLE 1-continued

Host to PTD Device

| Tag | Tag Description | Data | Attribute |
|---|---|---|---|
| POS | Position | This tag has several uses:<br>Cell for light tower or sort bar.<br>May also be used to indicate pick position. Typically 1–3 characters.<br>May also be used to indicate operator with work at this location in the event multiple operators are picking in an area.<br>If tag is not provided or empty, no position data displays. | F (Flash)<br>0 = no flash<br>1 = slow<br>2 = fast<br>If not provided, assume solid display.<br>C (Color) 1–4 |
| QTY | Quantity | Quantity to be picked/put at the location.<br><br><br><br>If quantity tag is not supplied or empty, no quantity displays. If 'A' attribute is not supplied, only the "-" or down adjustment button is active. | A (Adjustment)<br>0 = Down only-default<br>1 = Adjust up & down<br>2 = Adjust up only<br>3 = No adjustments allowed.<br>F (Flash)<br>0 = no flash<br>1 = slow<br>2 = fast<br>If not provided, assume solid display.<br>C (Color) 1–4 |
| SCR | Screen Layout | Specifies screen layout to be utilized.<br>1 = Default screen, TOP<br>2 = Default screen, BOTTOM<br>3 = Default screen, LEFT<br>4 = Default screen, RIGHT<br>9 = Text screen<br>13 = Display Tower screen, left<br>14 = Display Tower screen, right<br>21 = TOP Put<br>22 = BOTTOM Put<br>23 = LEFT Put<br>24 = RIGHT Put<br>25 = NE (points north east) Put<br>26 = NW (points north west) Put<br>27 = SE (points south east) Put<br>28 = SW (points south west) Put<br>31 = TOP Count<br>32 = BOTTOM Count<br>33 = LEFT Count<br>34 = RIGHT Count<br>35 = NE (points north east) Count<br>36 = NW (points north west) Count<br>37 = SE (points south east) Count<br>38 = SW (points south west) Count<br>If tag is not provided, ARW based default screen layout will be utilized. When supplied with "Set Location" identifies default screen. | B (Background color) 1–4 |
| SFTP | Screen FTP File | FTP file name of the image associated with the required screen specified in the message. (SCRxx.XML where XX = screen layout number in SCR tag) PTD client will use FTP to connect to the server and download the image. | A (IP Address) (default = Host IP address)<br>P (Path) (default = login directory) |
| TC | Task Complete | Indicates whether the task complete button on the device is active.<br>0 = Yes (default)<br>1 = No<br>If tag is not provided or empty, both task complete button and auxiliary input are active. | B (Button)<br>1 = Auxillary input is inactive (default)<br>2 = Button is inactive<br>3 = Both auxiliary and button are inactive |
| TDI | Troubleshooting Device ID | IP address where devices should send unsolicited status messages. Host will send at initial set up. Host will have a service monitoring unsolicited error messages via a TCP socket. | P (Port) (default = 1359) |
| TMR | Timer | Applies to operation 11 (sleep). Amount of time sleep in seconds. | N/A |
| VFTP | Video FTP File | FTP file name of the video file. PTD client will use FTP to connect to the server and download the video. | A (IP Address) (default = Host IP address)<br>P (Path) (default = login directory) |

Some notable commands from Table 1 that are sent from the host 102 will be described below. For the sake of brevity, not all of the tags and/or their attributes will be described in detail. Instead, please refer to Table 1 for a detailed description of the tags and their attributes. The source identification ("SID") and Device identification ("DID") tags provide the network address for the host 102 and the PTD device 106, respectively. The operation tag ("OP") is used to instruct the PTD device 106 what operation to perform. Typically, the source identification, device identification and operation tags are sent in every communication from the server 102 to the PTD device 106. The host to PTD device ("HTP") tag or element is used signify messages sent from the host 102 to the PTD device 106, and the PTD device to host tag ("PTH") tag is used in communications from the PTD device 106 to the host 102.

Within the operation tag, a number of operational commands can be sent. For example, the ping command ("7") can be sent to query and receive status information from one or more PTD devices 106 on the system 100. When sent, the reset command ("8") clears the memory 204 of one or more PTD devices 106 on the system 100. To send pick instruction to the PTD device 106, the pick command ("1") is used, and the put command ("2") is used for sending put away instructions to the PTD device 106. The count command ("4") is used in providing instruction for counting of items at a particular location, and the illuminate command ("3") is sent to illuminate the indicator light 206 and/or image display 208 of a selected PTD device 106. As will be described in greater detail below, the host 102 sends the set location command ("9") to download screen information, location product ID, product description, image, video and/or audio data to the PTD device 106 for a particular location. When the test command ("10") is sent from the host 102, one or more of the PTD devices 106 perform a self-diagnostic test and return status messages to the host 102. The set identification command ("11") sets the network address for a designated PTD device 106, and in return, the PTD device 106 sends to the host 102 a status response, which provides the status of the PTD device 106. The generic FTP command ("13") instructs the PTD device 106 to download files from the host 102 or another computer.

Some other tags that can be sent by the host 102 include the audio transfer ("AFTP"), image transfer ("IFTP"), screen transfer ("SFTP") and the video transfer ("VFTP") commands, which are used to identify the network addresses of audio, image, screen and video files to be downloaded onto the PTD device 106. The quantity tag ("QTY") is used to indicate the quantity to be added or removed from a designated storage location 402. The arrow tag ("ARW") denotes the location arrow 328 to display and signifies a particular storage location 402, which in turn is used for storing item information in memory 204. For example, if an arrow tag value of five ("5") is sent to the PTD device 106, the location arrow 328 on the PTD device 106 would point toward the upper right corner storage location 402 (in a northeast direction), as is shown in FIG. 3. In this example, the item information associated with the northeast storage location 402, such as product description and instructions, would be stored in memory 204 under the number five ("5") or northeast pointing location arrow 328. It is contemplated that in other embodiments the arrow tag value can signify the angular orientation of the location arrow 328 (in degrees or radians). Below in Table 2 is an example of an XML message that is sent by the host 102 to request the PTD device 106 to show a pick four ("4") instruction with the location arrow 328 pointing in a northeast direction (see, FIGS. 3 and 4).

TABLE 2

```
<?xml version="1.0" encoding="utf-8"?>
<HTP xmlns="HTP.XSD">
    <SID>10.0.0.134</SID>
    <DID>10.0.0.135</DID>
    <OP>1</OP>
    <ARW>5</ARW>
    <QTY >4</QTY>
</HTP>
```

In the above example, the number one ("1") in the operation tag indicates that a "pick" operation needs to be performed, and the arrow tag value of five ("5") indicates that the pick operation should occur at the northeast storage location 402. The number four ("4") in the quantity tag signifies that four (4) items should be picked from the bin 404 at the northeast storage location 402. In response to receipt of this message, the processor 202 of the PTD device 106 will display the "pick" instruction 324, the number four ("4") as the quantity value 326 and the northeast pointing location arrow 328 on the image display 208, as is shown in FIG. 3. By default, if additional information concerning the storage location 402 is stored in memory 204, such as a product description or an image of the product, the processor 202 of the PTD device 106 will display on the image display 208 the additional information. In the example illustrated in FIG. 3, the additional information for the northeast pointing location arrow 328 includes an image 320 of a bolt and a "bolt" product description 322.

Referring again to Table 1, the product description tag ("DSC") is used to supply a description of the product for a particular location, which is indicated by the location arrow 328. The indicator light ("IND") tag is used to control the illumination of the indicator light 206. The instruction text presence ("IT") and details ("ITS") are used to display instructions on the image display 208 of the PTD device 106. A lot number for a particular storage location (designated by the given location arrow) is indicated with the lot number tag ("LOT"). The new address identification ("NDI") tag is used to set a new network address for a PTD device 106. Products can be identified through the product identification tag ("PID"). The host 102 can control the playing of audio, video and/or other types of files via the play ("PLY") tag. In Table 1, the position tag ("POS") can have several uses. One use includes, indicating a cell for a light tower or sort bar. The position tag can also indicate a pick position or an operator where multiple operators are at the same location.

With reference to FIG. 3, the layout of the screen displayed on the image display 208 can be controlled via the screen tag ("SCR"). The screen layouts can specify the location, size, color and animation of text and arrows. Further, the screen layouts can specify the location and size of images displayed on the screen. In the PTD device 106, the host 102 can control the operation of the task complete button through the task complete tag ("TC"), and the time that the PTD device 106 remains in sleep mode can be controlled through the timer tag ("TMR"). The host 102 can conduct troubleshooting of PTD devices 106 through the troubleshooting tag ("TDI"). Table 3, below, summarizes the tags that can be used with each of the operation commands.

TABLE 3

| Operation | Tags |
|---|---|
| 1 = Pick | ARW. Arrow direction<br>IND. Indicator Light<br>POS. Position<br>QTY. Quantity<br>TC. Task complete enabled<br>IT. Instruction text<br>SCR. Screen layout to be used<br>PLY. Play audio/video |
| 2 = Put | ARW. Arrow direction<br>IND. Indicator Light<br>POS. Position<br>QTY. Quantity<br>TC. Task complete enabled<br>IT. Instruction text<br>SCR. Screen layout to be used<br>PLY. Play audio/video |
| 3 = Illuminate | IND. Indicator Light<br>IT. Instruction Text<br>SCR. Screen layout to be used |
| 4 = Count | ARW. Arrow direction<br>IND. Indicator Light<br>POS. Position<br>QTY. Quantity<br>TC. Task complete enabled<br>IT. Instruction text<br>SCR. Screen layout to be used<br>PLY. Play audio/video |
| 7 = Ping | N/A |
| 8 = Reset | N/A |
| 9 = Set Location | AFTP. Audio FTP path<br>ARW. Arrow to indicate location<br>DSC. Product description<br>IFTP. Image FTP path<br>IT. Instruction text<br>LOT. Lot number<br>PID. Product ID<br>SCR. Default screen layout<br>VFTP. Video FTP path |
| 10 = Self Test | N/A |
| 11 = Sleep | TMR. Sleep timer |
| 12 = Set ID | NDI. New PTD device IP address<br>TDI. Diagnostic Manager device IP address |
| 13 = Generic FTP | SFTP. Screen layout FTP path |

By combining the above-described tags in a message, the host 102 can supply a myriad of instructions to the PTD device 106.

In Table 4 below, examples are shown of some tags for messages that can be sent by the PTD devices 106 to the host 102, according to one embodiment. It again should be appreciated that other types of communication protocols can be used.

TABLE 4

PTD Device to Host

| Tag | Tag Description | Data | Attribute |
|---|---|---|---|
| | | REQUIRED TAGS | |
| SID | Source ID | TCP/IP address for source of message. Required tag. | N/A |
| DID | Device ID | TCP/IP address for destination device. Required tag. | N/A |
| OP | Operation | Operation values:<br>5 = Complete. Task complete.<br>6 = Status. Initiated by PTD.<br>7 = Set Up.<br>Required tag. | N/A |
| | | OPTIONAL TAGS | |
| AQT | Actual Quantity | Actual quantity picked/put at the location. | N/A |
| DST | Device status | Values are:<br>0 = Device OK<br>1 = Error condition<br>If device status is 1, ECS and EC tags are provided. | N/A |
| ECS | Presence of error conditions. Header level tag | When ECS is supplied, one or more EC tags are supplied as well. This is a node, not an element. Holds a collection of EC and ETX tags. | N/A |
| EC | Error condition details | One or more error conditions may be present. Values are:<br>1 = Invalid device<br>2 = Battery low<br>3 = Display unit problem<br>4 = Stuck task complete button<br>5 = Invalid message format<br>6 = Set ID failed<br>7 = Lost power to device<br>8 = Lost network connection<br>9 = FTP transfer error<br>etc. | N/A |
| ETX | Error text | Text information about an error condition. | EC (Error Condition) |
| OQT | Original Quantity | Original quantity requested to be picked/put at the location. | N/A |

The source identification ("SID") and device identification ("DID") tags, which provide network address information, are similar to the ones described above for the host 102. The operation tag ("OP") is used to send operational indicators to the host 102. These operational indicators include a task complete indicator ("5"), a status indicator ("6") and a set up indicator ("7"). Once a task is complete, such as when an operator pushes the task complete button 306, the PTD device 106 sends a message that contains the task complete indicator. The status indicator provides information about the status of the PTD device 106, the set up indicator is used in setting up the PTD device 106. In the embodiment of Table 4, each message the PTD device 106 sends to the host 102 needs to include the source identification, device identification and operation tags. However, it should be appreciated that in other embodiments the messages can be required to contain other types of information and/or instructions.

The status of the PTD device 106 and any error conditions in the PTD device 106 are communicated through a device status tag ("DST"), which indicates whether or not the PTD device 106 is operating properly. When the device status tag indicates that an error in the PTD device 106 has occurred ("1"), the error condition header tag ("ECS") as well as one or more error condition detail tags ("EC") are sent in the message to tell the host 102 what errors occurred. Optionally, an error text tag ("ETX") can be supplied to provide text for the error condition.

Some other tags that the PTD device 106 can send in a message include an actual quantity tag ("AQT"), which indicates the actual quantity of items picked/put (or counted) at a location, and an original quantity tag ("OQT"), which indicates the original quantity the host 102 requested. A sample "task complete" message from the PTD device 106 in response to the sample "pick" message from the host 102, which was described above with reference to FIGS. 3 and 4, is provided below in Table 5.

TABLE 5

```
<?xml version="1.0" encoding="utf-8"?>
<PTH xmlns="PTH.xsd">
    <SID>10.0.0.135</SID>
    <DID>10.0.0.134</DID>
    <OP>5</OP>
    <OQT>4</OQT>
    <AQT>4</AQT>
</PTH>
```

In the above discussed example, the host 102 sent a message instructing the PTD device 106 to display a "pick 4" instruction along with a northeast pointing location arrow 328 on the image display 208. For this sample message, the operator picked four (4) from the designated location, and therefore, did not need to change the displayed quantity value 326. If quantity actually picked was different from the quantity requested, the operator can press the first 308 or second 310 menu buttons to increase or decrease the quantity. After the operator has completed the task, the operator can press the task complete button 306 on the PTD device 106. Once the task complete button 306 is pressed, the processor 202 in the PTD device 106 generates and sends the above message to the host 102. In the sample message, the PTD device 106 indicates with the original quantity tag that the host requested four ("4") items to be picked and with the actual quantity tag that four ("4") items were indeed picked. If the operator adjusted the actual quantity picked to a different value, the actual quantity tag would contain the different value. Although the above example was described with reference to a pick service operation, it should be appreciated that the above sample messages, with some slight modifications, would be equally applicable for put or count instructions.

Figure 6:
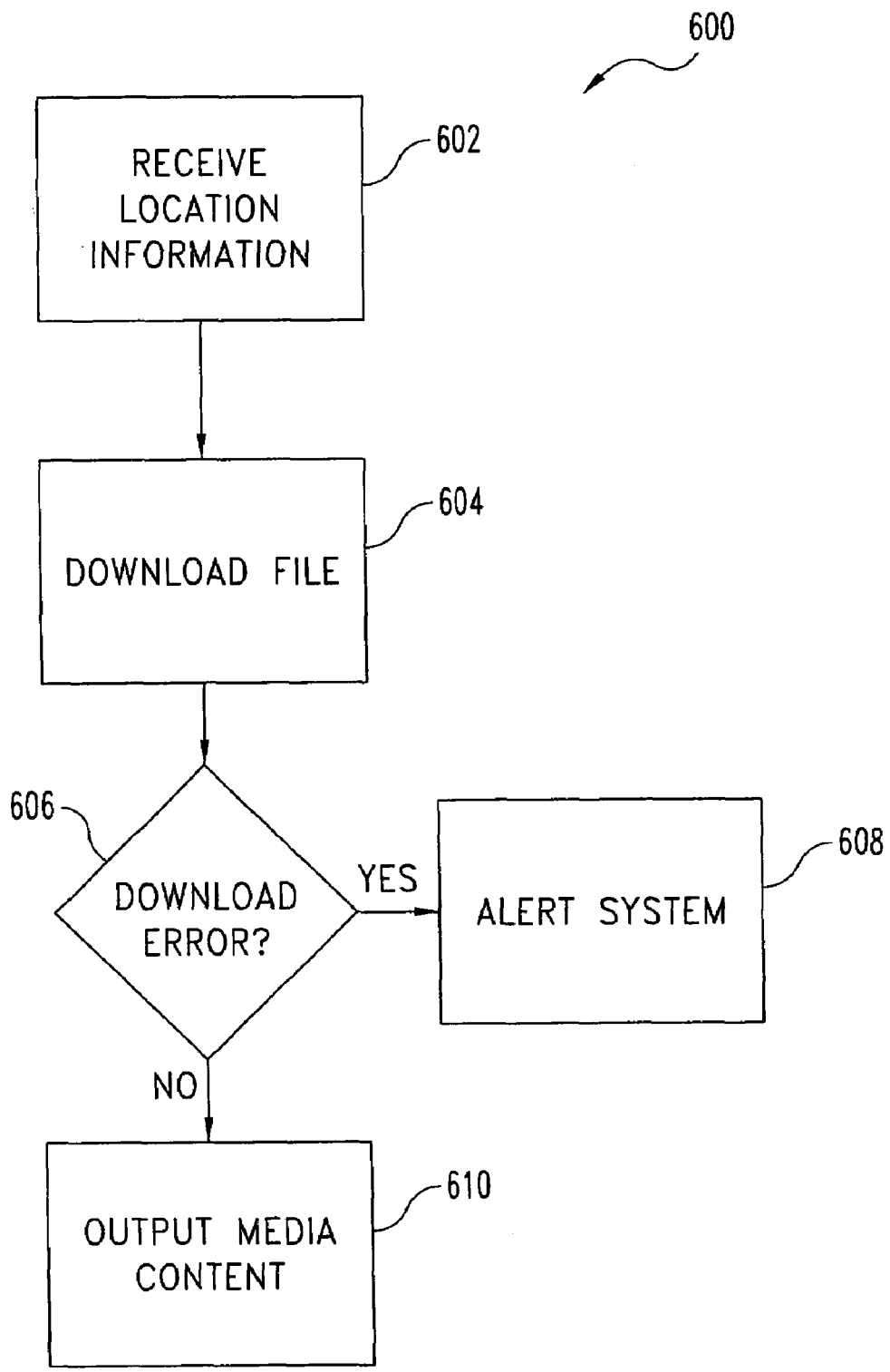
FIG. 6 is a flow diagram illustrating one technique for outputting media content with the FIG. 3 PTD device.

As noted above, each location arrow 328 is associated with a particular storage location 402 such that information concerning an item at a storage location 402, such as product information or handling instructions, is stored in memory 204 of the PTD device 106 in association with the particular location arrow 328. So for example in FIGS. 3 and 4, when bolts are stored in the upper right corner (northeast) bin 404, the information for the bolts is saved in memory 204 in association with the northeast pointing location arrow 328 (arrow number "5" in Table 1). For example, the product information can include a picture of the bolt, a video/animation showing the bolt being removed from the bin 404, a voice recording on how to handle the bolt, a part number for the bolt, and text that provides instructions for the bolt. Referring to FIG. 6, to store information about a designated storage location 402 in memory 204, the host 102 in stage 602 sends a set location information message to the PTD device 106. A sample set location message from the host 102 that sets the location information for the bolt is provided below in Table 6.

TABLE 6

```
<?xml version="1.0" encoding="utf-8"?>
<HTP xmlns="HTP.XSD">
    <SID>10.0.0.134</SID>
    <DID>10.0.0.135</DID>
    <OP>9</OP>
    <ARW>5</ARW>
    <PID>10-3432</PID>
    <DSC>Bolt</DSC>
    <AFTP P="ASAP_SERVER\SOUND\">10-3432.WAV</AFTP>
    <IFTP P="ASAP_SERVER\IMAGES\">10-3432.JPG</IFTP>
    <VFTP P="ASAP_SERVER\VIDEO\">10-3432.AVI</VFTP>
</HTP>
```

In stage 602, the processor 202 of the PTD device 106 receives the set location information message from the host 102 and stores the message content in memory 204. As mentioned above, the product information is stored in memory 204 in association with the location arrow 328 designated in the message. After receiving the above set location message, the processor 202 of the PTD device 106 stores in memory 204 under location arrow number "5" (northeast pointing arrow) the product ID "10-3432" and the product description "bolt". As will be described in greater detail below, in one embodiment, the processor 202 stores in memory 204 under the northeast location arrow 328, the network address/path for the sound file from the audio tag ("AFTP"), the network address/path for the image file from the image tag ("IFTP") and the network address/path for the video file from the video tag ("VFTP"). In another embodiment, the sound, image and video files are directly stored in memory 204 in association with the northeast pointing location ("5") arrow 328.

In stage 604, the processor 202 of the PTD device 106 downloads the files from the host 102 and/or from other file sources. As should be appreciated, the files can be downloaded from a number of sources, including the host 102 and/or file servers that are accessible to the PTD device 106. In one form of the present invention, the PTD device 106 in stage 604 downloads the files using the file transfer protocol (FTP). In this form, the PTD device 106 logs in as an "anonymous" user and uses the IP address of the PTD device 106 as the password. The transfers occur in binary mode. However, it should be appreciated that the files can be downloaded in other manners as would occur to those skilled in the art. If during stage 606, the processor 202 of the PTD device 106 determines that an error occurred during downloading of the files, the processor 202 sends a message to the host 102 that an error has occurred during downloading in stage 608. On the other hand, if no errors occur during downloading, the PTD device 106 outputs the media content from the files via the image display 208 and/or speaker 214.

As mentioned above, in one embodiment, only the network addresses/paths (i.e., the IP address and/or path) for the sound, image and/or video files are stored in memory 204 under the location arrow, and these media content files are downloaded (stage 604) on an as needed basis so as to conserve memory. If for example the PTD device 106 in this embodiment received the above sample message, the processor 202 would then store under the northeast pointing ("5") location arrow 328 the following file names/paths in memory 204: "ASAP_SERVER\SOUND\10-3432.WAV"; "ASAP_SERVER\IMAGES\10-3432.JPG"; and "ASAP_SERVER\VIDEO\10-3432.AVI". Afterwards, when the PTD device 106 receives instructions that require one or more of the files, the files are then downloaded at that time. The operator or host 102 can send the instructions to the PTD device 106 to initiate the download process. For example, when the PTD device 106 receives the "pick 4 from the northeast location" sample message, which was described above with reference to FIG. 3, the processor 202 then downloads and displays/plays the sound, image and/or video files for the northeast ("5") location arrow 328 (stage 610). In another example, the operator can navigate through the menus on the image display 208 to request that the image for the product in the northeast bin 404 be displayed (stage 610).

In another above-mentioned embodiment, the sound, image and/or video files are downloaded (stage 604) into memory 204 immediately after the set location message is received. These downloaded media content files are then stored in memory 204 under the location arrow 328 designated in the message so that the files are immediately available on the PTD device 106. The files in memory 204 can be later used to communicate instructions and/or other information to the operator. For instance, when the above-discussed "pick 4 from the northeast location" message is received, the processor 202 of the PTD device 106 retrieves the image file stored under the northeast pointing location arrow ("5") and displays the image 320 of the bolt on the image display 208 (FIG. 3). As should be appreciated that in other embodiments the operator, through the menu system, can directly view or listen to the media content stored in memory 204. It completed that in further embodiments a combination of the network path storage and direct file storage in memory 204 embodiments can be utilized.

In stage 610, the media content files can be displayed and/or played with the PTD device 106 automatically or through user input. As discussed above, the operator can input instructions to view the media content via the keypad 210, microphone 212 and/or in other manners. For instance, the operator can navigate with the menu buttons 304 the menu system displayed on the image display 208 in order to display an image of the product. The host 102 can also send a message that requires the one or more of the files. As noted above, the PTD device 106 in one embodiment defaults to displaying or playing the files stored in memory 204 for a designated location arrow 328 when a service command, such as "pick," "put" or "count", is received. In a second embodiment, the PTD device 106 needs a specific instruction from the host 102 before displaying or playing the files. The PTD device 106 can also be configured to display/play certain files by default and require specific commands to display/play the remaining files. For example, in a third embodiment, the PTD device 106 automatically displays image files; while at the same time requires explicit commands before playing the sound and video files. A sample message from the host 102 for the third embodiment is provided below in Table 7.

TABLE 7

<?xml version="1.0" encoding="utf-8"?>
<HTP xmlns="HTP.XSD">
  <SID>10.0.0.134</SID>
  <DID>10.0.0.135</DID>
  <OP>1</OP>
  <ARW>5</ARW>
  <QTY>4</QTY>
  <IND>2</IND>
  <PLY>1</PLY>
  <PLY>4</PLY>
</HTP>

When the PTD device 106 receives this "Pick 4" message, the processor 202 will flash the indicator light 206 because the indicator tag ("IND") has a value of two ("2"). In addition, the PTD device 106 will play the "10-3432.AVI" video file and the "10-3432.WAV" sound file. By default, the image of the product in the "10-3432.JPG" file is displayed on the image display for the northeast arrow ("5") product location.

Figure 7:
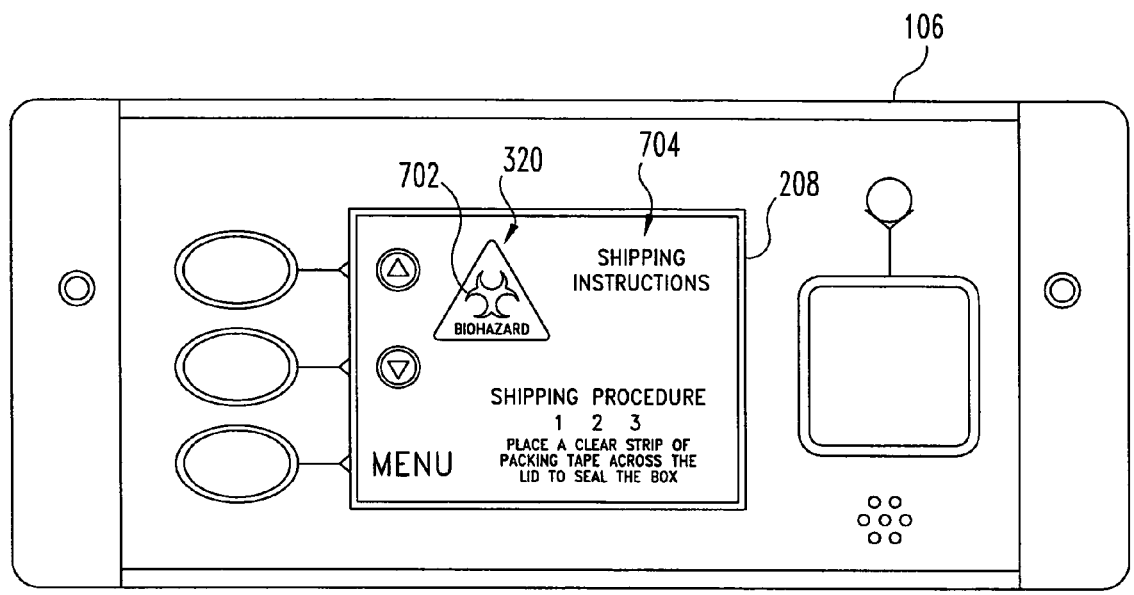
FIG. 7 is a front view of the FIG. 3 PTD device displaying a biohazard screen.

As noted above, having the ability to display images or videos of the product at the PTD device 106, helps to minimize the risk of the operator picking, placing or counting the wrong product. As shown in FIG. 3, the image 320 and description for a bolt along with the location arrow 328 is displayed on the image display 208. With the image display 208, the operator compares the actual item being serviced with the image 320 of the item, and if the two do not match, the operator can take the appropriate corrective measures. The image 320 displayed on the image display 208 can be a two-dimensional or three-dimensional image. When the image is three-dimensional, the operator is able to move or rotate the image 320 product via the menu keys 304. Hands free instructions or guidance can be supplied by the audio file, which can include voice instructions, being played on the speaker 214. Furthermore, additional content, such as handling or shipping instructions, can be supplied via the image display 208 and/or speaker 214 of the PTD device 106. An example of a shipping instruction screen is depicted in FIG. 7. In the FIG. 7 example, the image 320 displayed on the image display 208 is of a biohazard symbol 702 to alert the operator of the dangers associated with the item. In addition, handling instructions 704 are displayed on the image display 208. It should be recognized from the previous discussion that the PTD device 106 is capable of generating other types of screens, in addition to those described above.

Figure 8:
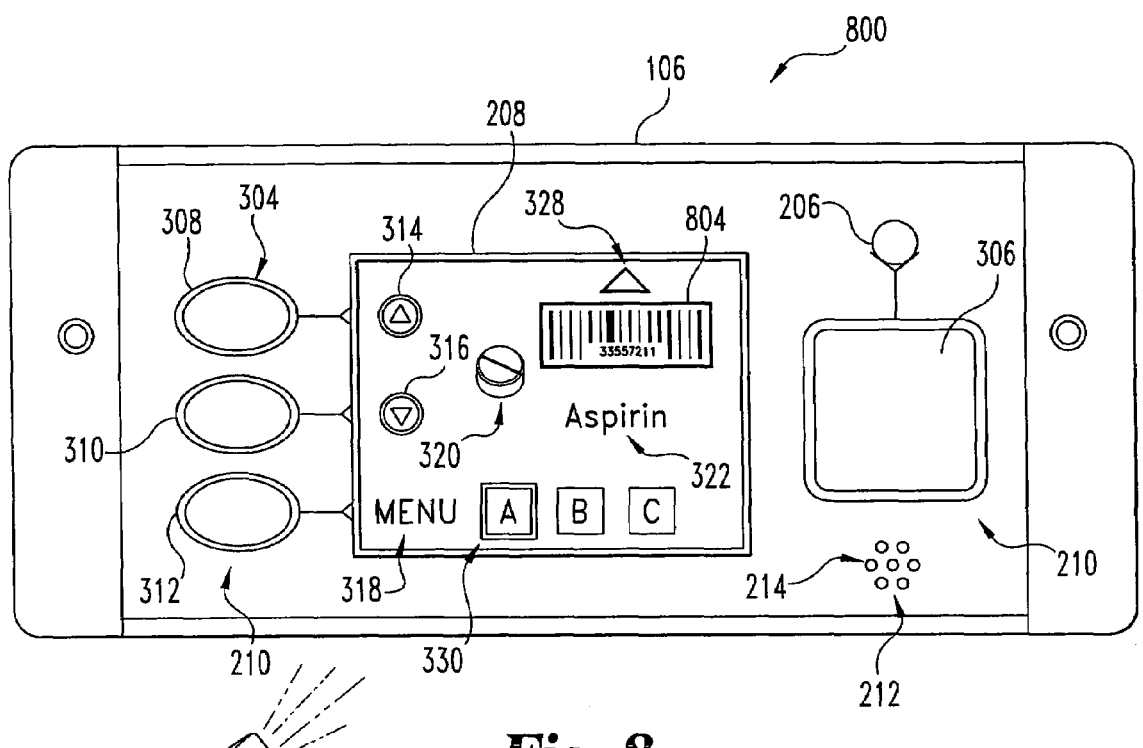
FIG. 8 is a front view of the FIG. 3 PTD device displaying a product barcode.
Figure 8:
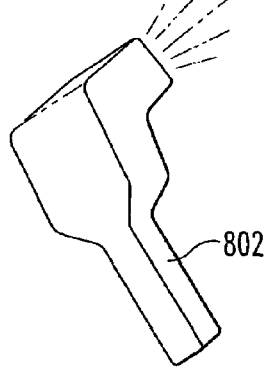

An example of another type of screen that the PTD device 106 is capable of generating is illustrated in FIG. 8. As shown, system 800 includes the PTD device 106 and barcode scanner 802 for scanning barcodes displayed on the PTD device 106 or elsewhere. In one embodiment, the barcode scanner 802 includes a charged coupled device (CCD) type barcode scanner, and in another embodiment, the scanner 802 includes a linear imager type barcode scanner, for both one-dimensional and two-dimensional barcodes. In one form, the barcode scanner 802 includes an Intermec CK30 type barcode scanner, and in another form, the barcode scanner 802 includes a HHP Dolphin 9500 type barcode scanner. However, it should be realized that other types of barcode scanners can be used. In the illustrated embodiment, the barcode scanner 802 is configured to communicate, either directly or indirectly, with the inventory tracking system 100. The connection can be a wired connection, a wireless connection or a combination of both. The barcode scanner 802 in one form is operable to communicate directly with the PTD devices 106 or indirectly through the host 102 over the networks 108, 114, 120. In another form, the barcode scanner 802 communicates with an older legacy system, which in turn communicates with the inventory system 100. It should be appreciated that the barcode scanner 802 can communicate in other manners. In selected embodiments, it is even envisioned that the barcode scanner 802 might not need to communicate with the inventory tracking system 100 or any of its components.

As depicted, the display 208 on the PTD device 106 is capable of displaying a barcode 804, which in this case represents a product being handled, such as via a stock keeping unit (SKU). In the illustrated example, the image 320 of the product represented by the barcode 804 is also displayed on the PTD device 106 along with its description 322 and the location arrow 328 pointing to where the product is located. As should be appreciated, other types information and in other formats can also be outputted from the PTD device 106. For instance, verbal instructions can be provided via the speaker 212 and/or a moving image can be displayed on the display 208. It should be understood that the barcode 804 can include any type of machine-readable representation of information in a visual format, such as linear barcodes, stacked barcodes, bulls-eye type barcodes, and two-dimensional barcodes, to name a few examples.

Figure 9:
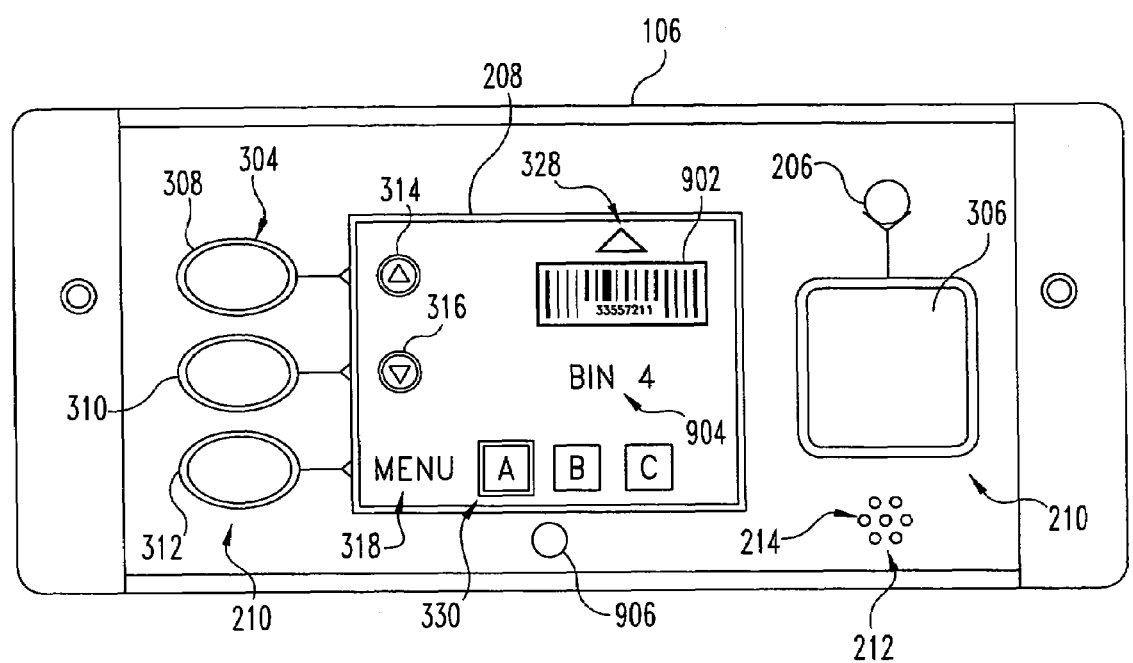
FIG. 9 is a front view of the FIG. 3 PTD device displaying a location barcode.

As mentioned before, in ever changing work-environments, it is difficult to effectively maintain and update barcode stickers for multiple service locations, such as for storage bins and racks. Paper stickers or tags sometimes cannot be placed where they can easily be read by a barcode scanner, or the stickers can become easily damaged or dirtied so as to become unreadable. To help remedy this situation, the PTD device 106 has the capability to display one or more location barcodes 902 that specify one or more locations, as is depicted in FIG. 9. The location barcode 902 in conjunction with the location arrows 328 allows the PTD device 106 to handle multiple locations, like is shown in FIG. 4. In the FIG. 9 embodiment, a location label or name 904 is also shown on the display 208 so as to identify the location to the user. It should be appreciated that other information can be outputted from the PTD device 106. Further, it is contemplated that the PTD device 106 can display barcodes conveying other types of information, beside product and location identifiers. By way of nonlimiting examples, the PTD device 106 can alternatively or additionally display barcodes that designate lot numbers, dates, suppliers, quantities, inspectors, plants and the like. Moreover, the PTD device 106 is configured to display more than one barcode at a time, if so desired. In one form, the PTD device 106 displays several barcodes at the same time such that the operator can make a selection from the list of barcodes.

With reference to FIG. 9, the PTD device 106 further incorporates at least one sensor 906 that senses environmental conditions so that the processor 202 of the PTD device 106 can adjust the image display 208 such that the scanner 802 can read the displayed barcode. In one embodiment, to compensate for dirt and dust accumulating on the PTD device 106, the sensor 906 includes a photodiode that that senses the ambient light levels and/or the light levels of a laser from the scanner 802 in order to adjust the display 208 accordingly. For instance, if the light level sensed by the sensor 906 is low, which indicates that the PTD device 106 is dirty, the PTD device 106 increases the brightness, color temperature, contrast, or some combination thereof on the display 208, at least when the barcode is displayed, so that the scanner 902 can read the barcode. Depending on the conditions, the PTD device 106 can make other adjustments to the display 208 in order to improve readability of the barcode. It is contemplated that other types of sensors 906, which sense other properties, can be utilized, and the sensors 906 can positioned at other locations on the PTD device 106. For example, a light sensor in one embodiment is incorporated into the display 208 in order to sense whether the display 208 is covered with dirt or not. With the sensor 906, the PTD device 106 can adjust the display 208 for many conditions, like low light levels, high light levels, dirt, humidity, condensation, and frost, to name a few.

With the PTD device 106, the logistics involved in updating barcodes is simplified. Barcodes can be updated individually or in a batch process, and barcodes can be dynamically changed over time and/or can change based on location. For example, as a carousel or assembly line moves, the location barcode 902 for a particular bin can change based on the current location received from the programmable logic control (PLC) system that operates the carousel or assembly line. In one embodiment, the barcodes are transferred as image files from the host 102 to the PTD devices 106. To transfer the image of the barcode, the file name and path of the barcode image are transported with the image transfer command or tag (IFTP), in the manner as was described above with reference to Table 1. The image of the barcode can be transferred and stored in the memory 204 of the PTD device 106 for later use, or can be downloaded onto the PTD device on an as needed basis, such as when a particular location or item is being serviced. To conserve memory, the PTD device 106 in another embodiment is configured to convert information embedded into designated tags into a barcode format. For instance, in one form a product barcode ("PBC") tag or command is sent to the PTD device 106 in order to transfer an image of the product barcode 804. In another example, the PTD device 106 converts the alphanumeric characters within the PBC tag for display as the barcode symbols on the display 208. Within or outside the barcode tag, other characters or commands can be used to designate the type of barcode that is to be displayed, such as a linear or two-dimensional barcode. In still yet another embodiment, the PTD device 106 converts the product identifier within the product identification tag (PID) to the product barcode 804 that is shown on the display 208. The location barcodes 902 as well as other barcodes are transferred to the PTD device 106 using techniques like those described above. For instance, the location barcode 902 in one embodiment is transferred as an image file, and in another embodiment, the location barcode 902 is represented by alphanumeric characters within a location barcode ("LBC") tag. It is contemplated that a combination of the above-described techniques, or even other techniques, can be used to specify the barcodes on the PTD device 106. In one example of such combination of techniques, the product barcode 804 is designated by the product identification tag (PID), and the location barcode 902 is sent as an image file.

The location of the PTD device 106 and the location barcode 902 can be specified when the PTD device 106 is installed. Personnel can manually designate the location by pressing the menu buttons 304 or the location can be automatically downloaded to the PTD device 106. In one technique, when the PTD device 106 is installed where location barcode labels were once used, the worker scans the old label with the scanner 802, and the scanner 802 transmits the location information to the inventory tracking system 100. In one embodiment, the scanner transmits the location information to the PTD device 106, and the PTD device 106 stores in memory 204 the scanned location information from the old bar code label for subsequent display as the location barcode 902. Alternatively or additionally, the PTD device 106 can convert the scanned barcode into a different format before the location barcode 902 is displayed. From the PTD device 106, this location information can then also be transmitted to the host 102 for subsequent processing. In another embodiment, the scanner 802 transmits the information to the host 102, which in turn downloads the location barcode 902 to the PTD device 106. It is envisioned in other embodiments that the PTD device 106 can incorporate a location detection system, such as a global positioning system and the like, so that the location of the PTD device 106 is automatically updated once moved.

As mentioned before, personnel sometimes experience difficulties in locating barcodes and aiming the scanner 802 at the right barcode, or experience problems by simply scanning barcodes out of the proper sequence. Initially, it should be recognized that the same PTD device 106 can display multiple barcodes designating different products, locations and other information. With this ability of the PTD device 106 to display multiple different barcodes, the difficulties associated with aiming the scanner 802 is reduced because the user can simply aim the scanner 802 at one location (i.e., the PTD device 106) and scan many different barcodes. Also, PTD device 106 allows barcodes to be updated automatically without the need to manually re-label locations and items.

A technique for displaying multiple barcodes and verifying the scanned barcodes from the PTD device 106 will now be described with reference to flow chart 1000 in FIG. 10. In order to aid in understanding, this technique will be described with reference to FIGS. 8 and 9. It, however, should understood that the below described technique is not intended to be limited to displaying only the barcodes and screens illustrated in those drawings, but this technique can be applied to display other types of barcodes and screen designs.

Figure 10:
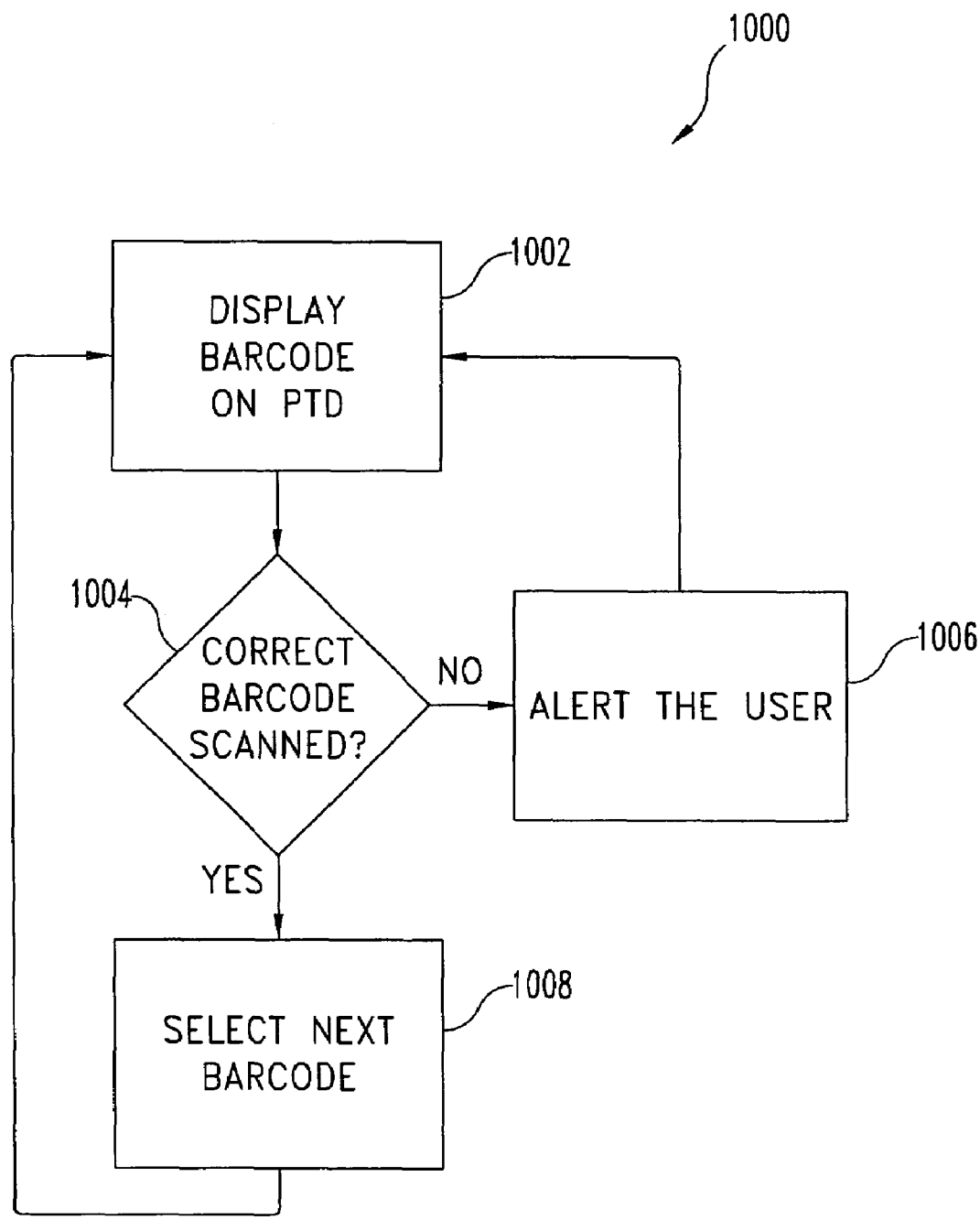
FIG. 10 is a flow diagram illustrating one technique for displaying successive barcodes on the FIG. 3 PTD device.

With reference to FIG. 10, the PTD device 106 in stage 1002 displays a first barcode, like the product barcode 804 in FIG. 8. If so desired, other information such as instructions on where to scan the barcode can be presented on the PTD device 106 along with the barcode. Once the barcode is displayed, the operator scans the barcode with the bar code scanner 802. As mentioned before, the barcode scanner 802 can communicate with the inventory tracking systems 100 in a number of ways, such as to the host 102 or to the PTD device 106. For explanation purposes only, the technique illustrated with flowchart 1000 will be described with reference to the embodiment in which the barcode scanner 802 directly communicates with the PTD device 106 through a wired or wireless connection. Nevertheless, it should be recognized that the barcode scanner 802 can communicate with the inventory system 100 in other manners. The PTD device 106 in stage 1004 determines whether or not the correct barcode was scanned. In other embodiments, the scanner 802 can communicate with the host 102, and the host 102 can forward the barcode information to the PTD device 106, which then makes the determination, or the host 102 in stage 1004 can determine if the correct barcode was scanned in stage 1004. In still yet another form, the barcode scanner 802 determines if the correct barcode was scanned in stage 1004, and the scanner 802 communicates an error message to the system 100 in response to the wrong barcode.

Returning again to the original example, the PTD device 106 stores in memory 204 the proper barcode scanning sequence and/or barcode types, which are used to determine if the proper barcode was scanned. In other embodiments, the barcode information can be stored on the host 102. By way of a nonlimiting example, a barcode sequence can be specified in which the product barcode 804 is suppose to be scanned before the location barcode 902. As mentioned before, an incorrect barcode can be scanned for a number of reasons, such as due to poor aim or scanning barcodes out of sequence. When an incorrect barcode is scanned, the PTD device 106 alerts the operator about the problem in stage 1006. The alert can come in many forms, like a visual alert, an audio alert, or a combination of both. Once the alert is provided, the same barcode is re-displayed or continues to be displayed in stage 1002. For example, an alert message can be displayed on the screen 208 along side the original barcode. In another example, the PTD device 106 can display instructions on which barcodes to scan before the barcode is again displayed in stage 1002. It is envisioned that in other embodiments, the alert in stage 1006 can be optional such that the alert can be omitted, if so desired.

When the correct barcode is scanned, the PTD device 106 selects the next barcode to display in stage 1008 and displays the barcode 1002. It should be appreciated that the PTD device 106 in stage 1004 can check barcodes from other sources besides those displayed on the PTD device 106. For example, the PTD device 106 can check the barcodes on packaging, pallets, and elsewhere. Also, it is envisioned that additional activities can occur before, during or after the stages illustrated in flowchart 1000. The PTD device 106 for example can provide further handling instructions and require their acknowledgement before the next barcode is displayed in stage 1002. In other instances, the PTD device 106 does not display any barcodes at certain times so that the operator is directed to scan barcodes that are located away from the PTD device 106, such as on product packaging.

To aid in understanding the technique, a non-limiting example of how the above-described technique works in practice will be described with reference to handling pharmaceuticals, which in this example is aspirin. If aspirin needs to be placed in bin number four (4), the PTD device 106 displays the product barcode 804 for aspirin along with the image 320 of the pill and its name 322, as is depicted in FIG. 9 (stage 1002). To help locate the bin, the location arrow 328 on the display 208 points towards the bin. The operator acknowledges that aspirin is being handled by scanning the product barcode 804, and the PTD device 106 checks to make sure that the product barcode 804 for aspirin was scanned, and not some other barcode, in stage 1004. If the product barcode 804 for aspirin was not scanned, the PTD device 106 generates a visual and/or audio alert to notify the operator about the problem (stage 1006). Otherwise, when the location barcode 902 was scanned, the PTD device 106 selects the next barcode to be displayed (stage 1008) and displays the barcode (stage 1002), which in the FIG. 9 example is the location barcode 902 for bin number four (4). Along with the location barcode 902, the location name 904 and arrow 328 for bin number four (4) are displayed on the PTD device 106. The operator acknowledges that bin number four (4) is being serviced by scanning the location barcode 902, and the PTD device 106 checks that the correct barcode is being scanned in stage 1004. It should be understood that the PTD device 106 can continue checking and displaying additional barcodes in a similar manner. For instance, to further confirm that the correct package of aspirin is being handled, the PTD device 106 can require the operator to scan the barcode on the packaging so that the barcode can be verified in stage 1004.

The PTD device 106 is further configured to allow for interactive barcode scanning in which the operator can select which barcodes to scan and specify the order in which the barcodes should be scanned. The operator can select location barcodes 902 as well as other barcodes by interacting with the PTD device 106. For example, if the operator needs to remove product from a particular storage location, the operator can press the menu buttons or use voice commands to prompt the PTD device 106 to move the location arrow 328 and display the location barcode 902 for the selected location. With the ability of the PTD device 106 to display multiple barcodes for different locations, the operator is able to quickly scan and process multiple barcodes in rapid succession without the need for locating the target barcode and re-aiming the barcode scanner 802 at the new target barcode. In other forms, the PTD device 106 is configured to compensate for when barcodes are scanned out of order. When the PTD device 106 determines that an incorrect barcode was scanned in stage 1004, but the scanned barcode still contained some later required information, the PTD device 106 stores in memory 204 the information and proceeds to alert the operator in stage 1006. Later on, the PTD device 106 skips over displaying and/or requiring the scanning of the barcode already stored in memory 204. As an example, the operator might accidentally scan the barcode on packaging, when they should have scanned the location barcode 902. In this example, the PTD device 106 will record the packaging barcode in memory 204 and again request that the operator to scan the location barcode 902.

While specific embodiments of the present invention have been shown and described in detail, the breadth and scope of the present invention should not be limited by the above described exemplary embodiments, but should be defined only in accordance with the following claims and their equivalents. All changes and modifications that come within the spirit of the invention are desired to be protected.

What is claimed is:

1. A method, comprising:
   providing a pick/put to display device that includes an alert device and a display, wherein the pick/put to display device is located proximal to at least a first inventory location and a second inventory location;
   drawing attention to the pick/put to display device by activating the alert device;
   displaying a first location barcode on the display that identifies the first inventory location; and
   displaying a second location barcode on the display that identifies the second inventory location.

2. The method of claim 1, wherein:
   the alert device includes an indicator light; and
   said drawing attention includes lighting the indicator light.

3. The method of claim 1, wherein:
   the alert device includes a speaker; and
   said drawing attention includes emitting a sound from the speaker.

4. The method of claim 1, further comprising displaying a product barcode that identifies a product stored at the first inventory location.

5. The method of claim 1, further comprising displaying a location arrow on the display that points to the first inventory location as the first location barcode is displayed.

6. A method, comprising:
   providing a pick/put to display device that includes an alert device and a display, wherein the pick/put to display device is located proximal to at least a first inventory location and a second inventory location;
   drawing attention to the pick/put to display device by activating the alert device;
   displaying a first location barcode on the display that identifies the first inventory location;
   displaying a second location barcode on the display that identifies the second inventory location;
   receiving a signal from a barcode scanner after said displaying the first location barcode;
   determining with the pick/put to display device that the first location barcode was not scanned by the barcode scanner based on the signal; and
   showing the first location barcode on the display in response to said determining.

7. The method of claim 6, further comprising displaying a notification message on the display to indicate that the first location barcode was not scanned in response to said determining.

8. The method of claim 6, further comprising:
   wherein the pick/put to display device includes a speaker; and
   playing a notification message on the speaker to indicate that the first location barcode was not scanned in response to said determining.

9. A method, comprising:
   providing a pick/put to display device that includes an alert device and a display, wherein the pick/put to display device is located proximal to at least a first inventory location and a second inventory location;
   drawing attention to the pick/put to display device by activating the alert device;
   displaying a first location barcode on the display that identifies the first inventory location;
   displaying a second location barcode on the display that identifies the second inventory location; and
   receiving the first location barcode at the pick/put to display device from a barcode scanner that scanned the first location barcode from a barcode label prior to said displaying the first location barcode.

10. A method, comprising:
    providing a pick/put to display device that includes an alert device and a display;
    drawing attention to the pick/put to display device by activating the alert device;
    displaying a first barcode on the display of the pick/put to display device;
    receiving input with the pick/put to display device;
    displaying a second barcode on the display of the pick/put to display device after said receiving the input;
    wherein said receiving the input includes receiving a signal from a barcode scanner;
    determining that the barcode scanner scanned the first barcode based on the signal with the pick/put to display device; and
    said displaying the second barcode after said determining that the barcode scanner scanned the first barcode.

11. A method, comprising:

providing a pick/put to display device that includes an alert device and a display;

drawing attention to the pick/put to display device by activating the alert device;

displaying a first barcode on the display of the pick/put to display device;

receiving input with the pick/put to display device;

displaying a second barcode on the display of the pick/put to display device after said receiving the input;

wherein the input is received from a barcode scanner; and wherein said displaying the first barcode continues until the input indicates that the first barcode was scanned.

12. An inventory tracking system, comprising:

a pick/put to display device located proximal to at least one storage location, the pick/put to display device including a processor, an alert device operatively coupled to the processor, the alert device being configured to draw attention to the pick/put to display device, and an image display operatively coupled to the processor, the image display being operable to display at least one barcode related to the storage location; and a server operatively coupled to the pick/put to display device, the server being operable to update the barcode by transmitting the update to the pick/put to display device;

wherein the barcode scanner is operatively coupled to the pick/put to display device; and wherein the pick/put to display device is operable to receive a signal from the barcode scanner and based on the signal determine if the barcode was scanned.

13. An inventory tracking system, comprising:

a pick/put to display device located proximal to at least one storage location, the pick/put to display device including a processor, an alert device operatively coupled to the processor, the alert device being configured to draw attention to the pick/put to display device, and an image display operatively coupled to the processor, the image display being operable to display at least one barcode related to the storage location; and a server operatively coupled to the pick/put to display device, the server being operable to update the barcode by transmitting the update to the pick/put to display device; and a sensor operatively coupled to the processor to sense one or more environmental conditions, wherein the processor is operable to adjust the image display based on the environmental conditions to enhance the barcode for scanning.

14. An inventory system, comprising:

a storage system including at least a first storage location and a second storage location; and a pick/put to display device positioned proximal the first storage location and the second storage location, the pick/put to display device including means for drawing attention to the pick/put to display device, and means for displaying a first barcode related to the first storage location and a second barcode related to the second storage location.

15. The system of claim 14, wherein:

said means for drawing attention includes an indicator light; and said means for displaying includes an image display.

16. The system of claim 14, wherein the first barcode includes a first location barcode that identifies the first location.

\* \* \* \* \*